United States Patent
Taketomi et al.

(10) Patent No.: US 8,781,270 B2
(45) Date of Patent: Jul. 15, 2014

(54) OPTICAL CROSS-CONNECT APPARATUS

(71) Applicant: Fujitsu Limited, Kawasaki (JP)

(72) Inventors: Hisashi Taketomi, Tama (JP); Yasuko Nozu, Kawasaki (JP); Kohei Ichimura, Fuchu (JP)

(73) Assignee: Fujitsu Limited, Kawasaki-Shi (JP)

( * ) Notice: Subject to any disclaimer, the term of this patent is extended or adjusted under 35 U.S.C. 154(b) by 28 days.

(21) Appl. No.: 13/726,831

(22) Filed: Dec. 26, 2012

(65) Prior Publication Data

US 2013/0243373 A1    Sep. 19, 2013

(30) Foreign Application Priority Data

Mar. 15, 2012  (JP) .................................. 2012-058664

(51) Int. Cl.
    *G02B 6/26*    (2006.01)
(52) U.S. Cl.
    USPC .......................................................... 385/20
(58) Field of Classification Search
    USPC .......................................................... 385/20
    See application file for complete search history.

(56) References Cited

U.S. PATENT DOCUMENTS

| | | | |
|---|---|---|---|
| 8,463,091 B2 * | 6/2013 | Kewitsch | 385/17 |
| 2007/0036544 A1 * | 2/2007 | Fukashiro et al. | 398/19 |
| 2012/0301137 A1 * | 11/2012 | Sakamoto | 398/16 |
| 2013/0343752 A1 * | 12/2013 | Graves et al. | 398/38 |

FOREIGN PATENT DOCUMENTS

| | | |
|---|---|---|
| JP | 2004-32088 | 1/2004 |
| JP | 2005-51750 | 2/2005 |

* cited by examiner

*Primary Examiner* — Sung Pak
(74) *Attorney, Agent, or Firm* — Staas & Halsey LLP

(57) ABSTRACT

An optical cross-connect apparatus includes: a plurality of switch units connected to each other via input ports and output ports; a storage unit to store a setting table in which output port information and corresponding input port information are associated together and registered for each optical signal such that the output port information identifies a specific output port, in the output ports, that outputs the optical signal and the input port information identifies a specific input port, in the input ports, that inputs the optical signal; a setting processor to set each switch unit in the plurality of switch units according to the setting table so as to set a wavelength for each optical signal that is input via the input ports or output via the output ports; and an update processor to update the content of the setting table in response to external input.

3 Claims, 28 Drawing Sheets

FIG. 4

| INPUT LINE | OUTPUT LINE | CHANNEL |
|---|---|---|
| #1 | #2 | 1 |
| #2 | #1 | 1 |
| #1 | #3 | 2 |
| #3 | #1 | 2 |
| #4 | #1 | 3 |
| #1 | #4 | 3 |
| #4 | #2 | 4 |
| #2 | #4 | 4 |
| #2 | #3 | 5 |
| #3 | #2 | 5 |

FIG. 5

| OUTPUT FROM: | | INPUT TO: | | OUTPUT FROM: | | INPUT TO: | |
|---|---|---|---|---|---|---|---|
| PORT | LINE | PORT | LINE | PORT | LINE | PORT | LINE |
| UNIT(1)-b | #1 | UNIT(5)-c | #1 | UNIT(3)-g | #3 | UNIT(1)-d | (#1) |
| UNIT(1)-f | (#1) | UNIT(2)-e | #2 | UNIT(3)-h | #3 | UNIT(2)-c | #2 |
| UNIT(1)-g | (#1) | UNIT(3)-d | #3 | UNIT(3)-i | #3 | UNIT(3)-j | #3 |
| UNIT(1)-h | (#1) | UNIT(4)-c | #4 | UNIT(4)-b | #4 | UNIT(8)-c | #4 |
| UNIT(1)-i | (#1) | UNIT(1)-j | (#1) | UNIT(4)-f | #4 | UNIT(1)-e | (#1) |
| UNIT(2)-b | #2 | UNIT(6)-c | #2 | UNIT(4)-g | #4 | UNIT(2)-d | #2 |
| UNIT(2)-f | #2 | UNIT(3)-e | #3 | UNIT(4)-h | #4 | UNIT(3)-c | #3 |
| UNIT(2)-g | #2 | UNIT(4)-d | #4 | UNIT(4)-i | #4 | UNIT(4)-j | #4 |
| UNIT(2)-h | #2 | UNIT(1)-c | (#1) | UNIT(5)-d | #1 | UNIT(1)-a | #1 |
| UNIT(2)-i | #2 | UNIT(2)-j | #2 | UNIT(6)-d | #2 | UNIT(2)-a | #2 |
| UNIT(3)-b | #3 | UNIT(7)-c | #3 | UNIT(7)-d | #3 | UNIT(3)-a | #3 |
| UNIT(3)-f | #3 | UNIT(4)-e | #4 | UNIT(8)-d | #3 | UNIT(4)-a | #4 |

FIG. 8

| OUTPUT FROM: | | INPUT TO: | | OUTPUT FROM: | | INPUT TO: | |
|---|---|---|---|---|---|---|---|
| PORT | LINE | PORT | LINE | PORT | LINE | PORT | LINE |
| UNIT(1)-b | #1 | UNIT(5)-c | #1 | UNIT(3)-g | #3 | UNIT(1)-d | #1 |
| UNIT(1)-f | #1 | UNIT(2)-e | #2 | UNIT(3)-h | #3 | UNIT(2)-c | #2 |
| UNIT(1)-g | #1 | UNIT(3)-d | #3 | UNIT(3)-i | #3 | UNIT(3)-j | #3 |
| UNIT(1)-h | #1 | UNIT(4)-c | #4 | UNIT(4)-b | #4 | UNIT(8)-c | #4 |
| UNIT(1)-i | #1 | UNIT(1)-j | #1 | UNIT(4)-f | #4 | UNIT(1)-e | #1 |
| UNIT(2)-b | #2 | UNIT(6)-c | #2 | UNIT(4)-g | #4 | UNIT(2)-d | #2 |
| UNIT(2)-f | #2 | UNIT(3)-e | #3 | UNIT(4)-h | #4 | UNIT(3)-c | #3 |
| UNIT(2)-g | #2 | UNIT(4)-d | #4 | UNIT(4)-i | #4 | UNIT(4)-j | #4 |
| UNIT(2)-h | #2 | UNIT(1)-c | #1 | UNIT(5)-d | #1 | UNIT(1)-a | #1 |
| UNIT(2)-i | #2 | UNIT(2)-j | #2 | UNIT(6)-d | #2 | UNIT(2)-a | #2 |
| UNIT(3)-b | #3 | UNIT(7)-c | #3 | UNIT(7)-d | #3 | UNIT(3)-a | #3 |
| UNIT(3)-f | #3 | UNIT(4)-e | #4 | UNIT(8)-d | #4 | UNIT(4)-a | #4 |

FIG. 10

| OUTPUT FROM: | | INPUT TO: | | OUTPUT FROM: | | INPUT TO: | |
|---|---|---|---|---|---|---|---|
| PORT | LINE | PORT | LINE | PORT | LINE | PORT | LINE |
| UNIT(1)-b | #1 | UNIT(5)-c | #1 | UNIT(3)-g | #3 | UNIT(1)-d | #1 |
| UNIT(1)-f | #1 | UNIT(2)-e | #2 | UNIT(3)-h | #3 | UNIT(2)-c | #2 |
| UNIT(1)-g | #1 | UNIT(3)-d | #3 | UNIT(3)-i | #3 | UNIT(3)-j | #3 |
| UNIT(1)-h | #1 | UNIT(4)-c | #4 | UNIT(4)-b | #4 | UNIT(8)-c | #4 |
| UNIT(1)-i | #1 | UNIT(1)-j | #1 | UNIT(4)-f | #4 | [UNIT(1)-c] | #1 |
| UNIT(2)-b | #2 | UNIT(6)-c | #2 | UNIT(4)-g | #4 | UNIT(2)-d | #2 |
| UNIT(2)-f | #2 | UNIT(3)-e | #3 | UNIT(4)-h | #4 | UNIT(3)-c | #3 |
| UNIT(2)-g | #2 | UNIT(4)-d | #4 | UNIT(4)-i | #4 | UNIT(4)-j | #4 |
| UNIT(2)-h | #2 | [UNIT(1)-e] | #1 | UNIT(5)-d | #1 | UNIT(1)-a | #1 |
| UNIT(2)-i | #2 | UNIT(2)-j | #2 | UNIT(6)-d | #2 | UNIT(2)-a | #2 |
| UNIT(3)-b | #3 | UNIT(7)-c | #3 | UNIT(7)-d | #3 | UNIT(3)-a | #3 |
| UNIT(3)-f | #3 | UNIT(4)-e | #4 | UNIT(8)-d | #3 | UNIT(4)-a | #4 |

FIG. 14

| OUTPUT FROM: | | INPUT TO: | | OUTPUT FROM: | | INPUT TO: | |
|---|---|---|---|---|---|---|---|
| PORT | LINE | PORT | LINE | PORT | LINE | PORT | LINE |
| UNIT(1)-b | #1 | UNIT(5)-c | #1 | UNIT(3)-g | #3 | UNIT(1)-d | #1 |
| UNIT(1)-h | #1 | UNIT(2)-e | #2 | UNIT(3)-h | #3 | UNIT(2)-c | #2 |
| UNIT(1)-g | #1 | UNIT(3)-d | #3 | UNIT(3)-i | #3 | UNIT(3)-j | #3 |
| UNIT(1)-f | #1 | UNIT(4)-c | #4 | UNIT(4)-b | #4 | UNIT(8)-c | #4 |
| UNIT(1)-i | #1 | UNIT(1)-j | #1 | UNIT(4)-f | #4 | UNIT(1)-e | #1 |
| UNIT(2)-b | #2 | UNIT(6)-c | #2 | UNIT(4)-g | #4 | UNIT(2)-d | #2 |
| UNIT(2)-f | #2 | UNIT(3)-e | #3 | UNIT(4)-h | #4 | UNIT(3)-c | #3 |
| UNIT(2)-g | #2 | UNIT(4)-d | #4 | UNIT(4)-i | #4 | UNIT(4)-j | #4 |
| UNIT(2)-h | #2 | UNIT(1)-c | #1 | UNIT(5)-d | #1 | UNIT(1)-a | #1 |
| UNIT(2)-i | #2 | UNIT(2)-j | #2 | UNIT(6)-d | #2 | UNIT(2)-a | #2 |
| UNIT(3)-b | #3 | UNIT(7)-c | #3 | UNIT(7)-d | #3 | UNIT(3)-a | #3 |
| UNIT(3)-f | #3 | UNIT(4)-e | #4 | UNIT(8)-d | #3 | UNIT(4)-a | #4 |

FIG. 19

| OUTPUT FROM: | | INPUT TO: | | OUTPUT FROM: | | INPUT TO: | |
|---|---|---|---|---|---|---|---|
| PORT | LINE | PORT | LINE | PORT | LINE | PORT | LINE |
| UNIT(1)-b | (#1) | UNIT(5)-c | #1 | UNIT(3)-g | #3 | UNIT(1)-d | (#1) |
| UNIT(1)-f | #1 | UNIT(2)-e | (#2) | UNIT(3)-h | #3 | UNIT(2)-c | (#2) |
| UNIT(1)-g | #1 | UNIT(3)-d | #3 | UNIT(3)-i | #3 | UNIT(3)-j | #3 |
| UNIT(1)-h | #1 | UNIT(4)-c | #4 | UNIT(4)-b | #4 | UNIT(8)-c | #4 |
| UNIT(1)-i | #1 | UNIT(1)-j | (#1) | UNIT(4)-f | #4 | UNIT(1)-e | (#1) |
| UNIT(2)-b | (#2) | UNIT(6)-c | #2 | UNIT(4)-g | #4 | UNIT(2)-d | (#2) |
| UNIT(2)-f | #2 | UNIT(3)-e | #3 | UNIT(4)-h | #4 | UNIT(3)-c | #3 |
| UNIT(2)-g | #2 | UNIT(4)-d | #4 | UNIT(4)-i | #4 | UNIT(4)-j | #4 |
| UNIT(2)-h | #2 | UNIT(1)-c | (#1) | UNIT(5)-d | #1 | UNIT(1)-a | #1 |
| UNIT(2)-i | #2 | UNIT(2)-j | (#2) | UNIT(6)-d | #2 | UNIT(2)-a | #2 |
| UNIT(3)-b | #3 | UNIT(7)-c | #3 | UNIT(7)-d | #3 | UNIT(3)-a | #3 |
| UNIT(3)-f | #3 | UNIT(4)-e | #4 | UNIT(8)-d | #3 | UNIT(4)-a | #4 |

FIG. 20

| OUTPUT FROM: | | INPUT TO: | | OUTPUT FROM: | | INPUT TO: | |
|---|---|---|---|---|---|---|---|
| PORT | LINE | PORT | LINE | PORT | LINE | PORT | LINE |
| UNIT(1)-b | (#2) | UNIT(6)-c | #2 | UNIT(3)-g | #3 | UNIT(1)-d | (#2) |
| UNIT(1)-f | #1 | UNIT(2)-e | (#1) | UNIT(3)-h | #3 | UNIT(2)-c | (#1) |
| UNIT(1)-g | #1 | UNIT(3)-d | #3 | UNIT(3)-i | #3 | UNIT(3)-j | #3 |
| UNIT(1)-h | #1 | UNIT(4)-c | #4 | UNIT(4)-b | #4 | UNIT(8)-c | #4 |
| UNIT(1)-i | #1 | UNIT(1)-j | (#2) | UNIT(4)-f | #4 | UNIT(1)-e | (#2) |
| UNIT(2)-b | (#1) | UNIT(5)-c | #1 | UNIT(4)-g | #4 | UNIT(2)-d | (#1) |
| UNIT(2)-f | #2 | UNIT(3)-e | #3 | UNIT(4)-h | #4 | UNIT(3)-c | #3 |
| UNIT(2)-g | #2 | UNIT(4)-d | #4 | UNIT(4)-i | #4 | UNIT(4)-j | #4 |
| UNIT(2)-h | #2 | UNIT(1)-c | (#2) | UNIT(5)-d | #1 | UNIT(1)-a | #1 |
| UNIT(2)-i | #2 | UNIT(2)-j | (#1) | UNIT(6)-d | #2 | UNIT(2)-a | #2 |
| UNIT(3)-b | #3 | UNIT(7)-c | #3 | UNIT(7)-d | #3 | UNIT(3)-a | #3 |
| UNIT(3)-f | #3 | UNIT(4)-e | #4 | UNIT(8)-d | #3 | UNIT(4)-a | #4 |

US 8,781,270 B2

OPTICAL CROSS-CONNECT APPARATUS

CROSS-REFERENCE TO RELATED APPLICATION

This application is based upon and claims the benefit of priority of the prior Japanese Patent Application No. 2012-058664, filed on Mar. 15, 2012, the entire contents of which are incorporated herein by reference.

FIELD

The embodiments discussed herein are related to an optical cross-connect apparatus.

BACKGROUND

With increasing demand for communication capacity, communication networks that use wavelength division multiplexing (WDM) technology are becoming increasingly widespread. With WDM technology a plurality of optical signals with different wavelengths are multiplexed and transmitted. A WDM apparatus using WDM technology is capable of transmitting a greater amount of data at a high speed compared with other transmission apparatuses.

An example of a transmission apparatus using WDM technology is an optical add-drop multiplexer such as a reconfigurable optical add-drop multiplexer (ROADM). The optical add-drop multiplexer includes an optical signal transmitting/receiving unit that may be called a transponder. The optical add-drop multiplexer multiplexes optical signals input from the transmitting/receiving unit and transmits the resultant multiplexed optical signal elsewhere. Conversely, when a multiplexed signal is received from elsewhere, the optical add-drop multiplexer extracts a signal that has a particular wavelength and outputs the resultant signal to the transmitting/receiving unit.

The optical add-drop multiplexer includes an optical cross-connect apparatus that includes both an optical amplifier and a wavelength selective switch disposed for each line such that multiplexed signals are allowed to be transmitted along different lines. Note that in the embodiments discussed here, a line refers to a transmission line extending from an optical cross-connect apparatus to a node with which a connection for communication is or may be established.

The optical amplifiers and the wavelength selective switches are connected via optical fibers. The number of optical fibers used in an optical add-drop multiplexer (for example, several hundred) is greater than other types of transmission apparatuses, and thus misconnections of optical fibers may be more likely to occur.

To deal with misconnected optical fibers, for example, Japanese Laid-open Patent Publication No. 2005-51750 discloses a technique of detecting and correcting a misconnected optical fiber with reference to a transmitting port and a receiving port between transmission apparatuses. Japanese Laid-open Patent Publication No. 2004-32088 discloses a technique of detecting a misconnected optical fiber by comparing the optical power level at the stage preceding a multiplexer apparatus, which is configured to multiplex a plurality of wavelength signals, with the optical power level at the stage following the multiplexer apparatus.

SUMMARY

According to an aspect of the invention, an optical cross-connect apparatus includes: a plurality of switch units connected to each other via a plurality of input ports and a plurality of output ports such that wavelength-multiplexed signals are input and output between two or more lines, and each optical signal with a respective wavelength included in a wavelength-multiplexed signal is transmitted from a first line of the lines to a second line of the lines or from the second line to the first line; a storage unit configured to store a setting table in which output port information and corresponding input port information are associated together and registered for each optical signal such that the output port information identifies a specific output port, in the plurality of output ports, that outputs the optical signal and the input port information identifies a specific input port, in the plurality of input ports, that inputs the optical signal; a setting processor configured to set each switch unit in the plurality of switch units according to the setting table so as to set a wavelength for each optical signal that is input via the input ports or output via the output ports; and an update processor configured to update the content of the setting table in response to information of external input.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a table illustrating an example of a path management table;

FIG. 5 is a table illustrating an example of a setting table;

FIG. 8 is a table indicating portions associated with the misconnections of the first example in the setting table illustrated in FIG. 5;

FIG. 10 is a table illustrating a setting table updated so as to correct the misconnections in the first example;

FIG. 14 is a table illustrating a setting table updated so as to correct the misconnections in the second example;

FIG. 19 is table indicating portions associated with the misconnections of the third example in the setting table illustrated in FIG. 5;

FIG. 20 is a table illustrating a setting table updated so as to correct the misconnections of the third example;

DESCRIPTION OF EMBODIMENTS

An operation to correct a misconnected optical fiber includes identifying the misconnected optical fiber, disconnecting the optical fiber from a connection port to which the optical fiber is misconnected, and reconnecting the optical fiber to the correct port to which the optical fiber is supposed to be connected. In the optical cross-connect apparatus, each wavelength selective switch is connected to a plurality of other switches, and thus each wavelength selective switch has a large number of ports, which results in a complicated fiber connection configuration. As a result, the optical cross-connect apparatus has a problem in that the process of correcting a misconnected optical fiber may take time and effort.

In view of the above, the embodiments discussed herein provide an optical cross-connect apparatus that allows a misconnected optical fiber to be corrected with ease.

Figure 1:
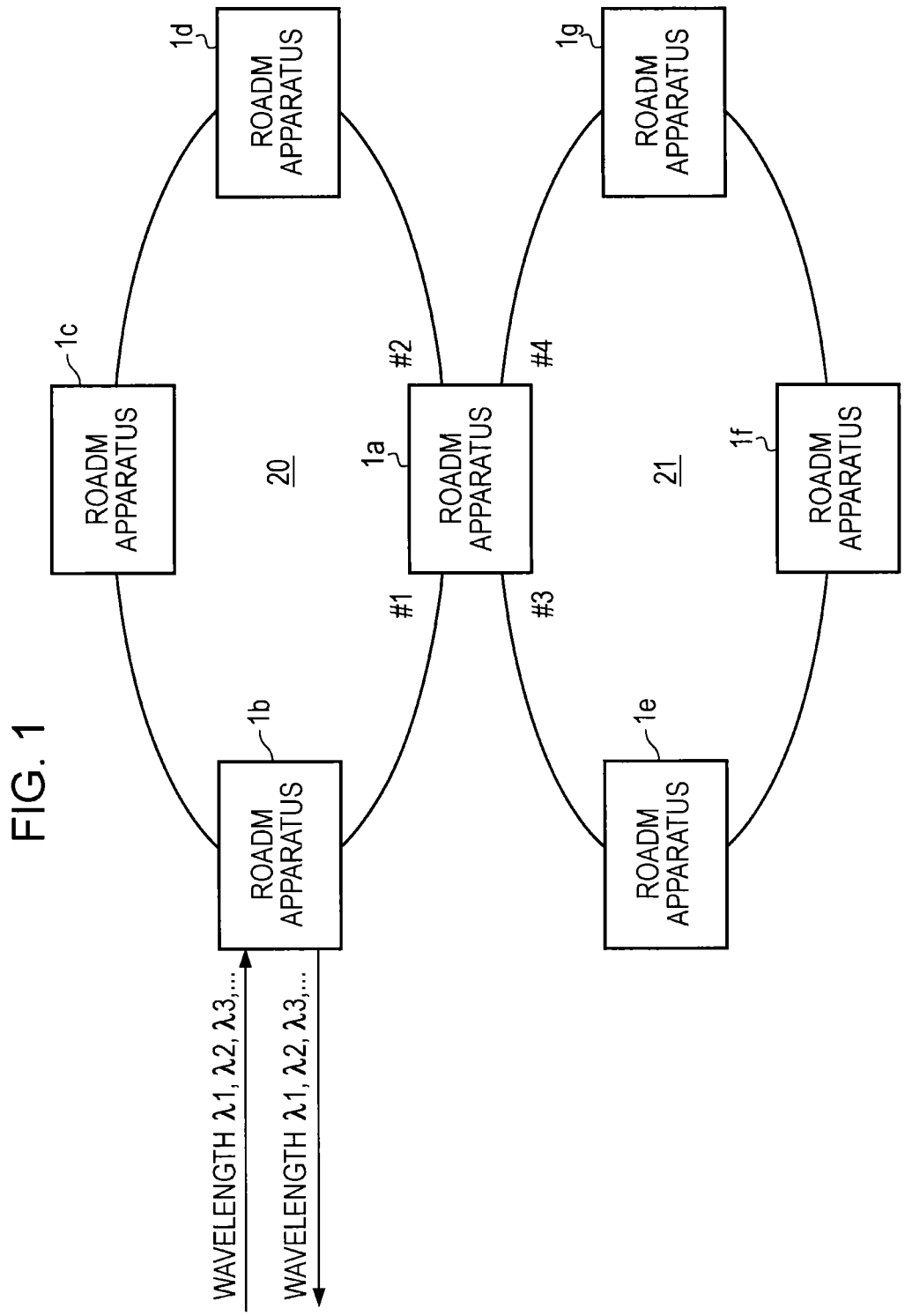
FIG. 1 is a configuration diagram illustrating an example of a network that includes a ROADM apparatus.

FIG. 1 illustrates an example of a configuration of a network that includes ROADM apparatuses. The ROADM apparatuses 1a to 1g form, for example, two ring-shaped networks 20 and 21. Hereinafter, the ROADM apparatuses 1a to 1g will be generically referred to as a ROADM apparatus 1. The ROADM apparatus 1 is configured to wavelength-multiplex optical signals that are input with individual wavelengths λ1, λ2, λ3, . . . , and transmit the resultant wavelength-multiplexed optical signal in the networks 20 and 21. The ROADM apparatus 1 also has a function of demultiplexing wavelength-multiplexed signals into individual optical signals with respective wavelengths λ1, λ2, λ3, . . . , and outputting the resultant optical signals. By properly setting the optical signal path individually for each wavelength in the ROADM apparatuses 1, it becomes possible to transmit the corresponding optical signals between specified ROADM apparatuses 1.

Of the ROADM apparatuses 1a to 1g, the ROADM apparatus 1a is disposed at a node that connects the two networks 20 and 21. Therefore, the ROADM apparatus 1a has four lines #1 to #4 via which the ROADM apparatus 1a is connected to other ROADM apparatuses 1b, 1d, 1e, and 1g. In the following description, the ROADM apparatus 1a is taken as an example. The other ROADM apparatuses 1b to 1g are configured in a similar manner to the ROADM apparatus 1a.

Figure 2:
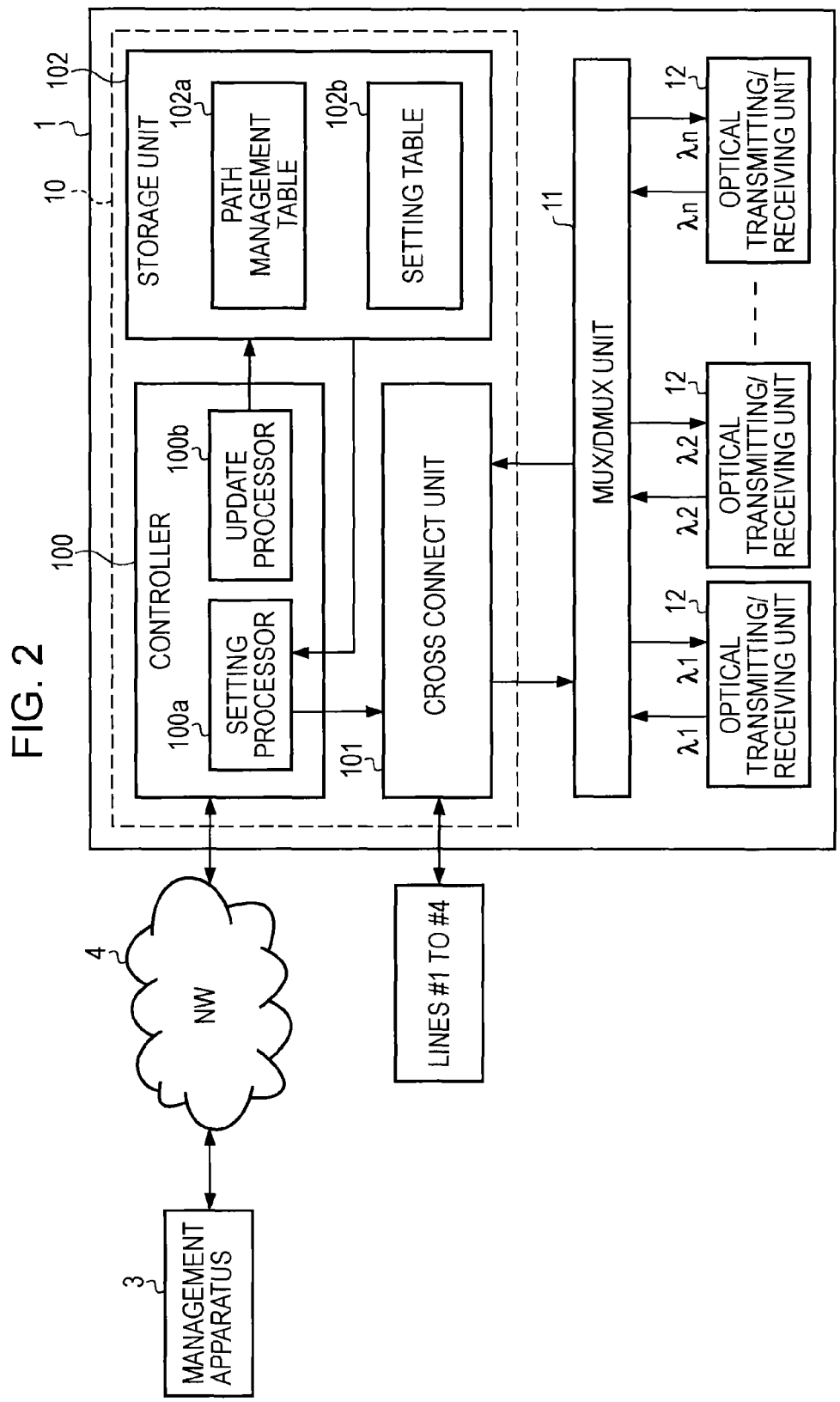
FIG. 2 is a diagram illustrating a functional configuration of a ROADM apparatus.

FIG. 2 is a diagram illustrating a functional configuration of the ROADM apparatus 1. The ROADM apparatus 1 includes an optical cross-connect apparatus 10. The optical cross-connect apparatus 10 includes a controller 100, a cross-connect unit 101, and a storage unit 102.

The cross-connect unit 101 includes wavelength selective switches to switch the path of an optical signal, which corresponds to a wavelength included in a wavelength-multiplexed signal, so that the optical signal is transmitted along a specific line of lines #1 to #4.

Figure 3:
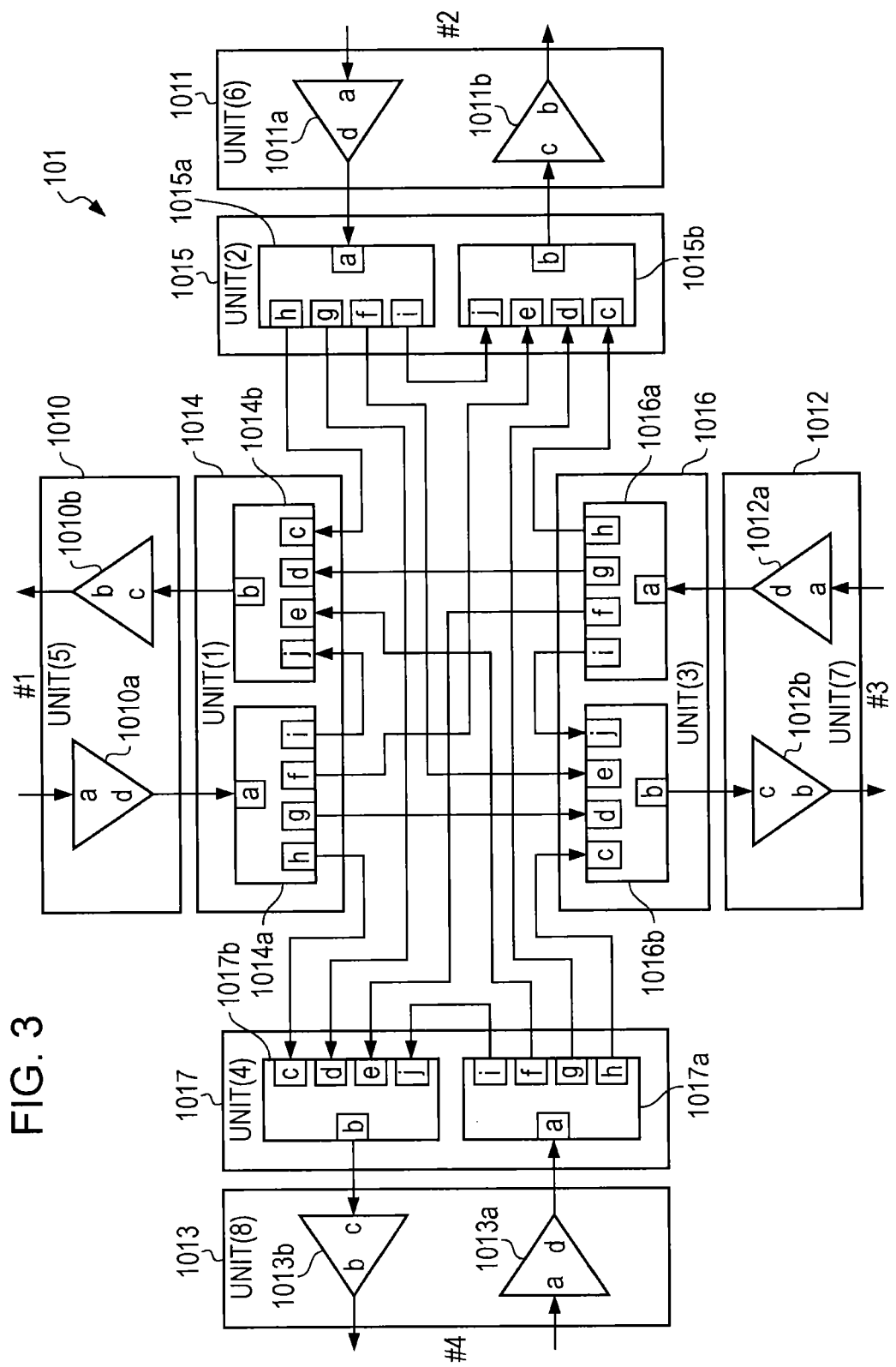
FIG. 3 is a diagram illustrating a configuration of a cross-connect unit.

FIG. 3 illustrates a configuration of the cross-connect unit 101. The cross-connect unit 101 includes a plurality of switch units 1014 to 1017 and a plurality of amplifier units 1010 to 1013. The switch units 1014 to 1017 are connected to each other via optical fibers. The amplifier units 1010 to 1013 are connected to other apparatuses via optical fibers along the lines #1 to #4 and are also connected to the switch units 1014 to 1017 via optical fibers.

The switch units 1014 to 1017 respectively correspond to the lines #1 to #4. The switch units 1014 to 1017 respectively include receiving-side wavelength selective switches 1014a to 1017a that are each configured to receive a wavelength-multiplexed signal, and also include transmitting-side wavelength selective switches 1014b to 1017b that are each configured to transmit a wavelength-multiplexed signal. The amplifier units 1010 to 1013 respectively correspond to the lines #1 to #4, and the respective amplifier units 1010 to 1013 include receiving-side amplifiers 1010a to 1013a each configured to amplify an input wavelength-multiplexed signal and transmitting-side amplifiers 1010b to 1013b each configured to amplify wavelength-multiplexed signal to be output.

Each of the receiving-side amplifiers 1010a to 1013a includes an input port (a) and an output port (d). Each of the receiving-side amplifiers 1010a to 1013a is input with a wavelength-multiplexed signal from the corresponding one line of the lines #1 to #4 via the input port (a), and outputs an amplified wavelength-multiplexed signal to the corresponding one switch unit of the switch units 1014 to 1017 via the output port (d).

Conversely, each of the transmitting-side amplifiers 1010b to 1013b includes an input port (c) and an output port (b). Each of the transmitting-side amplifiers 1010b to 1013b is input with a wavelength-multiplexed signal from the corresponding one switch unit of the switch units 1014 to 1017 via the input port (c) and outputs an amplified wavelength-multiplexed signal to the corresponding one line of the lines #1 to #4 via the output port (b).

Each of the receiving-side wavelength selective switches 1014a to 1017a includes a line-side input port (a) and a plurality of output ports (h), (g), (f), and (i). Conversely, each of the transmitting-side wavelength selective switches 1014b to 1017b includes a line-side output port (b) and a plurality of input ports (j), (e), (d), and (c).

In FIG. 3 and subsequent figures, the input port (a) and the output port (d) of each of the receiving-side amplifiers 1010a to 1013a, the input port (c) and the output port (b) of each of the transmitting-side amplifiers 1010b to 1013b, the line-side input port (a) and the output ports (h), (g), (f), and (i) of each of the receiving-side wavelength selective switches 1014a to 1017a, and the line-side output port (b) and the input ports (j), (e), (d), and (c) of each of the transmitting-side wavelength selective switches 1014b to 1017b are denoted by corresponding alphabetic symbols without being enclosed in parentheses.

The switch units 1014 to 1017 are input with and output wavelength-multiplexed signals from and to the respective lines #1 to #4 via the corresponding amplifier units 1010 to 1013. The switch units 1014 to 1017 are connected to each other via the input ports (j), (e), (d), and (c) and the output ports (h), (g), (f), and (i) such that each optical signal that corresponds to a specific wavelength included in a wavelength-multiplexed signal is guided from one line to another line or in the opposite direction.

The line-side input port (a) of each of the receiving-side wavelength selective switches 1014a to 1017a is connected to the output port (d) of a corresponding one receiving-side amplifier of the receiving-side amplifiers 1010a to 1013a. Each of the receiving-side wavelength selective switches 1014a to 1017a receives a wavelength-multiplexed signal from the corresponding one receiving-side amplifier, of the receiving-side amplifiers 1010a to 1013a, via the line-side input port (a).

The output ports (h), (g), and (f) of each of the receiving-side wavelength selective switches 1014a to 1017a are respectively connected to the input ports (c), (d), and (e) of a different transmitting-side wavelength selective switch of the transmitting-side wavelength selective switches 1014b to 1017b, that corresponds to a different line of the lines #1 to #4. The receiving-side wavelength selective switches 1014a to 1017a each demultiplex the multiplexed signals input from the respective receiving-side amplifiers 1010a to 1013a and output each resultant optical signal for a respective wavelengths via the output ports (h), (g), (f), and (i). The wavelength of each output optical signal is determined according to the control of the controller 100.

The input ports (e), (d), and (c) of each of the transmitting-side wavelength selective switches 1014b to 1017b are respectively connected to the output ports (h), (g), and (f) of a different receiving-side wavelength selective switch of the receiving-side wavelength selective switches 1014a to 1017a that corresponds to a different line of the line #1 to #4. Each of the transmitting-side wavelength selective switches 1014b to 1017b multiplexes each optical signal for a particular wavelength that is input from the respective input ports (e), (d), (c), and (j) and outputs the resultant multiplexed signal from the respective output port (b). The wavelengths of the multiplexed optical signals are determined under the control of the controller 100. The input port (j) of each of the transmitting-side wavelength selective switches 1014b to 1017b is connected to the output port (i) of the corresponding one receiving-side wavelength selective switch of the receiving-side wavelength selective switches 1014a to 1017a as will be mentioned later.

Due to the above-described configuration, the cross-connect unit 101 wavelength-multiplexes each optical signal for a respective wavelength that is included in the wavelength-multiplexed signals input from the lines #1 to #4 and outputs the resultant multiplexed signal to a line of the lines #1 to #4 that is different from the line via which the optical signals is input. Hereinafter, in the description of connections between ports of the cross-connect unit 101, the switch units 1014 to 1017 may also be referred to as units (1) to (4), respectively, and the amplifier units 1010 to 1013 may also be referred to as units (5) to (8), respectively.

In FIG. 2, the storage unit 102 is a storage device such as a memory, and is configured to store information associated with the path management table 102a and the setting table 102b. In the path management table 102a, path information linking lines #1 to #4 is recorded for each channel (that is, each wavelength) of optical signals transmitted between the lines #1 to #4. The setting table 102b records connection information indicating a connection configuration for inside the cross-connect unit 101.

FIG. 4 illustrates an example of the path management table 102a. In the path management table 102a, for each optical signal channel (refer to the "channel" column), input line information indicating the line from which the optical signal is input (refer to the "input line" column) and output line information indicating the line to which the optical signal is output (refer to the "output line" column) are associated together and registered. Each channel corresponds to an optical signal for a particular wavelength that is included in the wavelength-multiplexed signal input from a line of the lines #1 to #4. For example, an optical signal for channel-1 is transmitted either from the line #1 to the line #2 or from the line #2 to the line #1 via the cross-connect unit 101. An optical signal for channel-2 is transmitted either from the line #1 to the line #3 or from the line #3 to the line #1 via the cross-connect unit 101.

Figure 6:
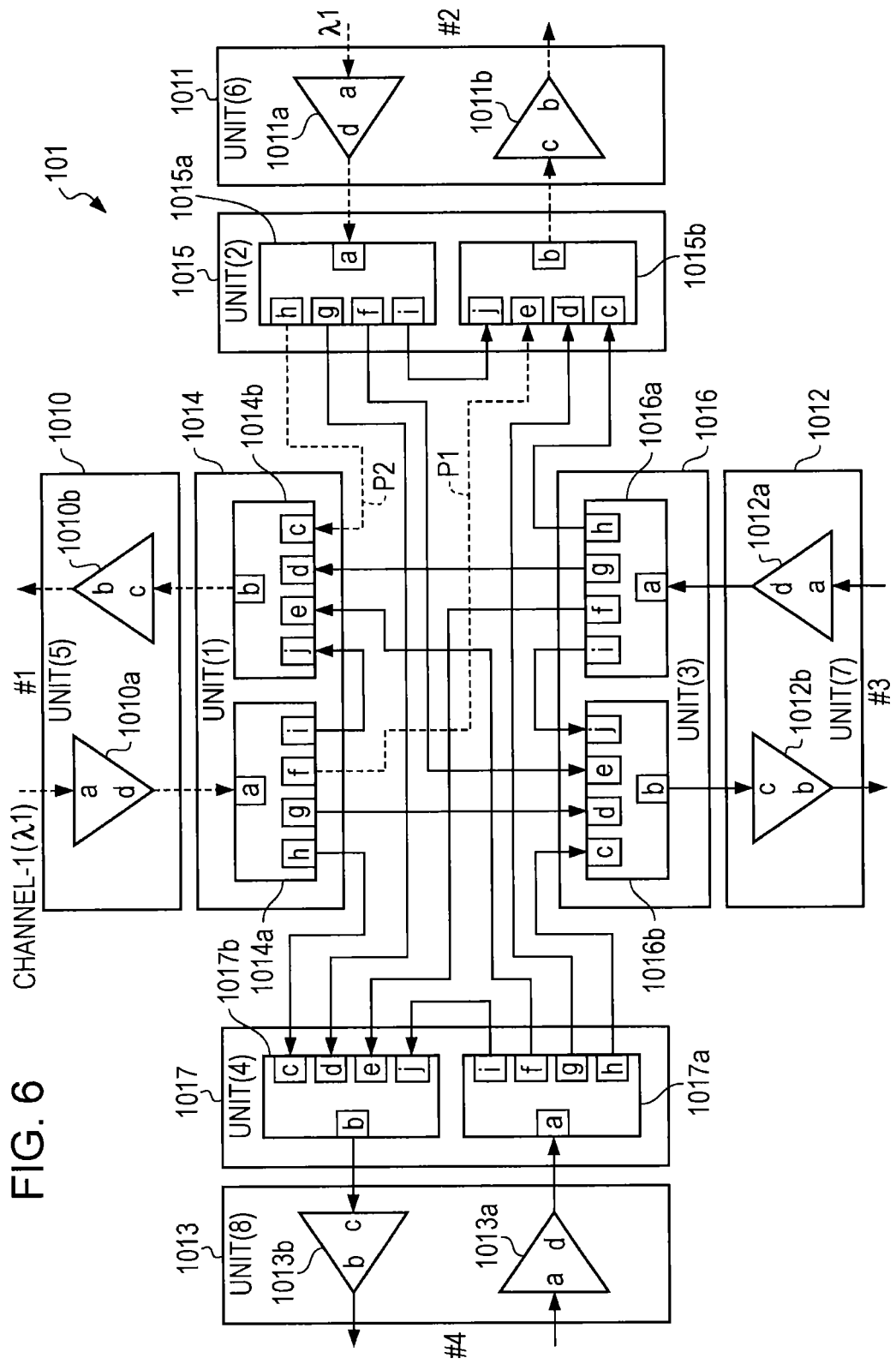
FIG. 6 is a configuration diagram illustrating optical signal paths that includes paths between a line #1 and a line #2 in a cross-connect unit.

FIG. 5 illustrates an example of the setting table 102b. FIG. 6 is a configuration diagram of the cross-connect unit that illustrates optical signal paths between the line #1 and the line #2. In the setting table 102b, for each optical signal, output port information and input port information are registered in pairs that correspond to each other. The output port information indicates which of the output ports (h), (g), (f), and (i) of the receiving-side wavelength selective switches 1014a to 1017a is assigned as an output port through which an optical signal is input (see the "PORT" column under the "OUTPUT FROM" column). For example, in the field denoted by a reference numeral 90, "UNIT(1)-f" under "OUTPUT FROM" indicates the output port (f) of the receiving-side wavelength selective switch 1014a, which corresponds to "UNIT(1)" in FIG. 3.

The input port information indicates which of the input ports (j), (e), (d), (c) of the transmitting-side wavelength selective switches 1014b to 1017b is assigned as an input port through which an optical signal is input. For example, in the field denoted by the reference numeral 90, "UNIT(2)-e" of "INPUT TO" identifies the input port (e) of the transmitting-side wavelength selective switch 1015b, which corresponds to the "UNIT(2)" in FIG. 3.

In FIG. 5, "LINE" under "OUTPUT FROM" and "LINE" under "INPUT TO" respectively correspond to the input line information and the output line information in the path management table 102a, and indicate that an optical signal is transmitted between these lines. Note that "LINE" is automatically determined according to a particular rule as described later.

For example, in a field denoted by a reference numeral 90 in FIG. 5, the output port (f) of the unit (1) of the line #1 is registered as output port information, and the input port (e) of the unit (2) of the line #2 is registered as input port information. According to the path management table 102a illustrated in FIG. 4, channel-1 is assigned as the path from the line #1 to the line #2. Thus, as illustrated in FIG. 6, a path P1 for the channel-1 from the line #1 to the line #2 is set such that the path P1 extends from the output port (f) of the switch unit 1014 (unit (1)) to the input port (e) of the switch unit 1015 (unit (2)).

In this case, when λa is the wavelength of channel-1, the receiving-side wavelength selective switch 1014a demultiplexes the wavelength-multiplexed signals supplied from the line-side input port (a) and, of the optical signals for each respective wavelength, outputs an optical signal with the wavelength λa from the output port (f). Conversely, the transmitting-side wavelength selective switch 1015b multiplexes an optical signal having the wavelength λa, which is input from the receiving-side wavelength selective switch 1014a, with other optical signals and outputs the resultant multiplexed signal from the line-side output port (b) to the receiving-side amplifier 1011b. Thus, the path for channel-1 from the line #1 to the line #2 is established.

Furthermore, for example, in a field denoted by a reference numeral 91 in FIG. 5, the output port (h) of the unit (2) of the line #2 is registered as output port information, and the input port (c) of the unit (1) of the line #1 is registered as input port information. According to the path management table 102a illustrated in FIG. 4, channel-1 is set for a path from the line #2 to the line #1. Thus, as illustrated in FIG. 6, the path P2 for channel-1 from the line #2 to the line #1 is set such that the path P2 extends from the output port (h) of the switch unit 1015 (unit (2)) to the input port (c) of the switch unit 1014 (unit (1)).

In this case, the receiving-side wavelength selective switch 1015a demultiplexes the wavelength-multiplexed signals supplied from the line-side input port (a) and of the optical signals for each respective wavelengths outputs an optical signal with the wavelength λa from the output port (h). Conversely, the transmitting-side wavelength selective switch 1014b multiplexes an optical signal having the wavelength λan, which is input from the receiving-side wavelength selective switch 1015a, with other optical signals and outputs the resultant multiplexed signals from the line-side output port (b) to the receiving-side amplifier 1010b. Thus, the path for channel-1 from the line #2 to the line #1 is established.

Furthermore, in the setting table 102b, output port information indicating the line-side output port (b) of the transmitting-side wavelength selective switches 1014b to 1017b and input port information indicating the input port (c) of the transmitting-side amplifiers 1010b to 1013b are associated together and registered. Each line corresponding to the input port (c) of each of the transmitting-side amplifiers 1010b to 1013b is determined, for example, based on slot positions of the respective amplifier units 1010 to 1013 in a rack of the apparatus 1. The line of the input port (c) is not limited to that described above, but the line of the input port (c) may be determined based on setting (provisioning) by a management apparatus 3 as described in further detail later.

A line corresponding to the line-side output port (b) of each of the transmitting-side wavelength selective switches 1014b to 1017b is determined according to the line of the input port (c) of the corresponding one transmitting-side amplifier of the transmitting-side amplifiers 1010b to 1013b. Furthermore, the input ports (j), (e), (d), and (c) of each of the transmitting-side wavelength selective switches 1014b to 1017b are determined so as to correspond to the same line as the line that corresponds to the output port (b).

For example, in a field denoted by a reference numeral 80, input port information for the transmitting-side wavelength selective switch 1014b and output port information for the transmitting-side amplifier 1010b are associated with each other and registered. The line for the transmitting-side amplifier 1010b is set to "#1" according to the slot position. In conjunction, the line for the line-side input port (b) of the transmitting-side wavelength selective switch 1014b is also set to "#1". Furthermore, the line for the input ports (j), (e), (d), and (c) of the transmitting-side wavelength selective switch 1014b is set to the same line as the line for the output port (b), that is, line #1 (in FIG. 5, see line numbers enclosed in broken circles in the column "LINE" under the column "INPUT TO").

Furthermore, in the setting table 102b, the line-side input ports (a) of the respective receiving-side wavelength selective switches 1014a and 1017a and the output ports (d) of the corresponding receiving-side amplifiers 1010a to 1013a are associated with each other and registered. A line corresponding to the output port (d) of each of the receiving-side amplifiers 1010a to 1013a is determined in a similar manner to the input port (c) of each of the transmitting-side amplifiers 1010b to 1013b.

A line corresponding to the line-side input port (a) of each of the receiving-side wavelength selective switches 1014a to 1017a is determined according to the line of the output port (d) of the corresponding one receiving-side amplifier of the receiving-side amplifiers 1010a to 1013a. Furthermore, a line corresponding to the output ports (h), (g), (f), and (i) of each of the receiving-side wavelength selective switches 1014a to 1017a is determined so as to be the same as the line corresponding to the input port (a).

For example, in a description in a field denoted by reference numeral 81 in FIG. 5, input port information associated with the receiving-side amplifier 1010a and input port information associated with the receiving-side wavelength selective switch 1014a are associated together and registered. The line of the receiving-side amplifier 1010a is set to "#1" according to the slot position. In conjunction, the line of the input port (a) of the receiving-side wavelength selective switch 1014a is also set to "#1". Furthermore, the line of the output ports (h), (g), (f), and (i) of this receiving-side wavelength selective switch 1014a is set to the same line as the line corresponding to the input port (a), that is, line #1 (see line numbers enclosed in broken circles in the column "LINE" of the column "OUTPUT FROM").

The controller 100 in FIG. 2 is, for example, calculating processor circuit such as a central processing unit (CPU) and is configured to perform processes according to particular programs. The controller 100 is not limited to something that functions by software but the controller 100 may function by hardware such as an application specific integrated circuit (ASIC).

The controller 100 includes a setting processor 100a and an update processor 100b. The setting processor 100a sets the cross-connect unit 101 according to the path management table 102a and the setting table 102b. More specifically, the setting processor 100a sets the respective switch units 1014 to 1017 according to the setting table 102b such that optical signals with particular wavelengths are input and output via the input ports (j), (e), (d), and (c) and the output ports (h), (g), (f), and (i), as described above.

The update processor 100b updates the content of the setting table 102b according to input from elsewhere. The controller 100 is connected to the management apparatus 3 via the communication network 4, and the controller 100 receives the content to be updated from the management apparatus 3. The management apparatus 3 is, for example, a terminal apparatus such as a personal computer in which management software is installed and is configured to function as a network management apparatus that manages, for example, the networks 20 and 21 illustrated in FIG. 1. The communication network 4 may be of a wired or wireless type.

The ROADM apparatus 1 further includes a MUX/DMUX unit 11 and a plurality of optical transmitting/receiving units 12. Each optical transmitting/receiving unit 12 is also called a name, such as a transponder, and is configured to input/output optical signals with different wavelengths λ1 to λn from/to the MUX/DMUX unit 11. The optical transmitting/receiving units 12 may be configured to input/output optical signals with wavelengths different from those illustrated in the drawings.

The MUX/DMUX unit 11 multiplexes optical signals with respective wavelengths that are input from the optical transmitting/receiving units 12 and outputs resultant multiplexed optical signals to the cross-connect unit 101. The cross-connect unit 101 outputs the wavelength-multiplexed signals input from the MUX/DMUX unit 11 to respective lines #1 to #4 via the transmitting-side wavelength selective switches 1014b to 1017b. The connection between the cross-connect unit 101 and the MUX/DMUX unit 11 is not illustrated in FIG. 3 and subsequent figures.

Wavelength-multiplexed signals are input to the MUX/DMUX unit 11 from the respective lines #1 to #4 via the cross-connect unit 101, and the MUX/DMUX unit 11 demultiplexes the wavelength-multiplexed signals into optical signals for respective wavelengths and outputs the resultant optical signals to the optical transmitting/receiving units 12. Thus, as illustrated in FIG. 1, each of the ROADM apparatuses 1a to 1g in the networks 20 and 21 is allowed to input and output an optical signal with an arbitrary wavelength. The cross-connect unit 101, the MUX/DMUX unit 11, and the optical transmitting/receiving units 12 are connected to each other via optical fibers. The MUX/DMUX unit 11 and the optical transmitting/receiving units 12 are controlled by the controller 100, in terms of, for example, setting of channels.

As described above, each unit in the ROADM apparatus 1 is connected to a greater number of optical fibers than other types of optical transmission apparatuses. As a result, a misconnected optical fiber may occur when the apparatus 1 is installed or in other situations, as described below.

First Example of Misconnection

Figure 7:
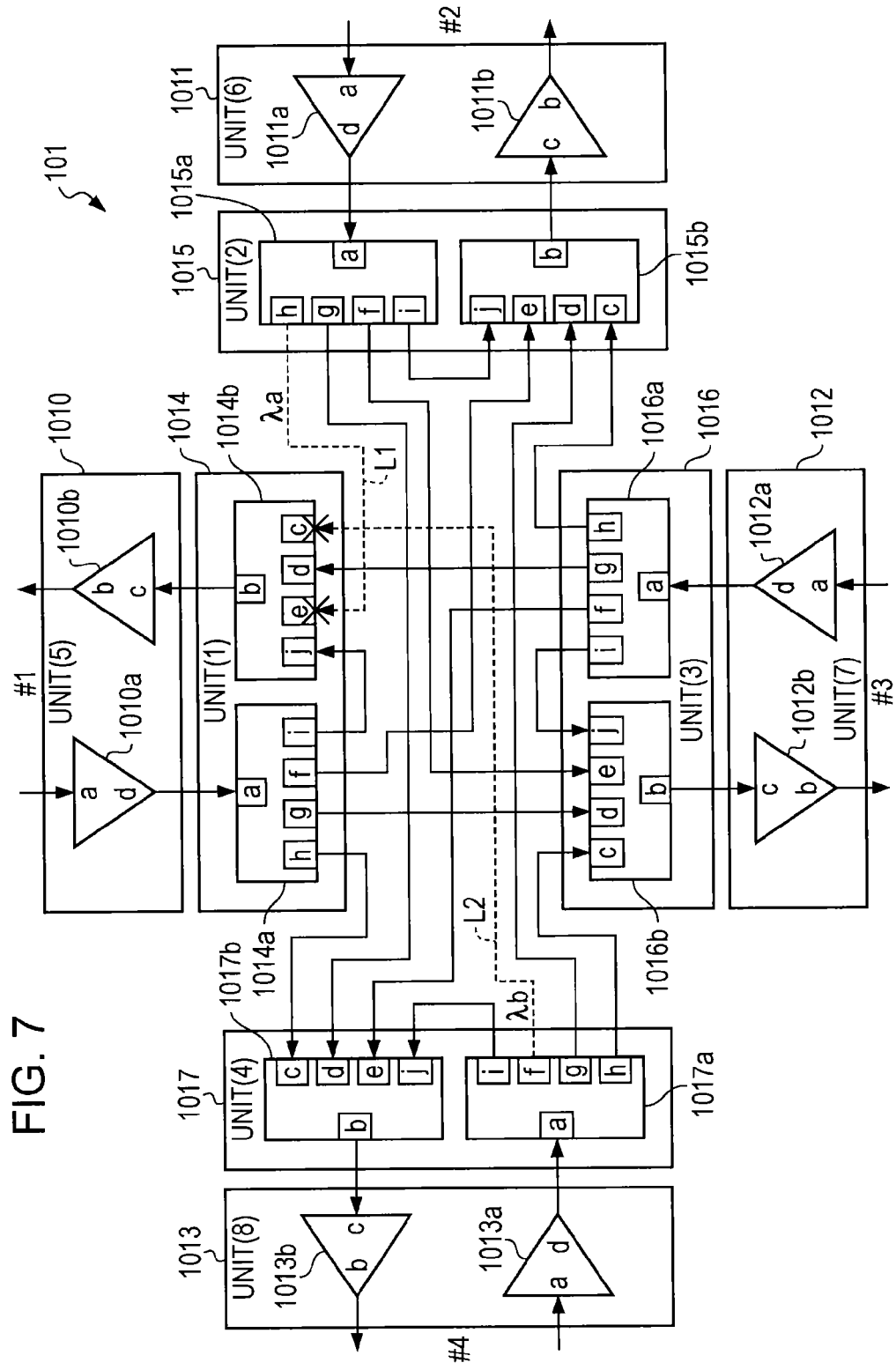
FIG. 7 is a diagram illustrating a first example of misconnections that may occur in the cross-connect unit illustrated in FIG. 3.

FIG. 7 illustrates a first example of a misconnected optical fiber that may occur in the cross-connect unit 101 illustrated in FIG. 3. FIG. 8 illustrates particular portions, in the setting table illustrated in FIG. 5, that are related to the misconnections of the first example. In this example, optical fibers L1 and L2 are respectively misconnected to the input ports (e) and (c) of the transmitting-side wavelength selective switch 1014b of the line #1 (as represented by dotted lines). According to the path management table 102a illustrated in FIG. 4 and the setting table 102b illustrated in FIG. 5, the input port (e) is assigned to an optical signal channel-3 (refer to a row denoted by a reference numeral 93 in FIG. 8, and FIG. 4). The input port (c) is assigned to an optical signal channel-1 (refer to a row denoted by a reference numeral 92 in FIG. 8, and FIG. 4).

Therefore, when the wavelength of channel-1 is λa and the wavelength of channel-3 is λb, then an optical signal with the wavelength λb is incorrectly input to the input port (e) despite the wavelength λb not being selected, and an optical signal with the wavelength λa is incorrectly input to the input port (c) despite the wavelength λa not being selected. Thus, the transmitting-side wavelength selective switch 1014b of the line #1 does not output optical signals with the selected wavelengths, which are different, for the channel-1 and channel-3 to the line #1 (as represented by symbols x in FIG. 7).

Figure 9:
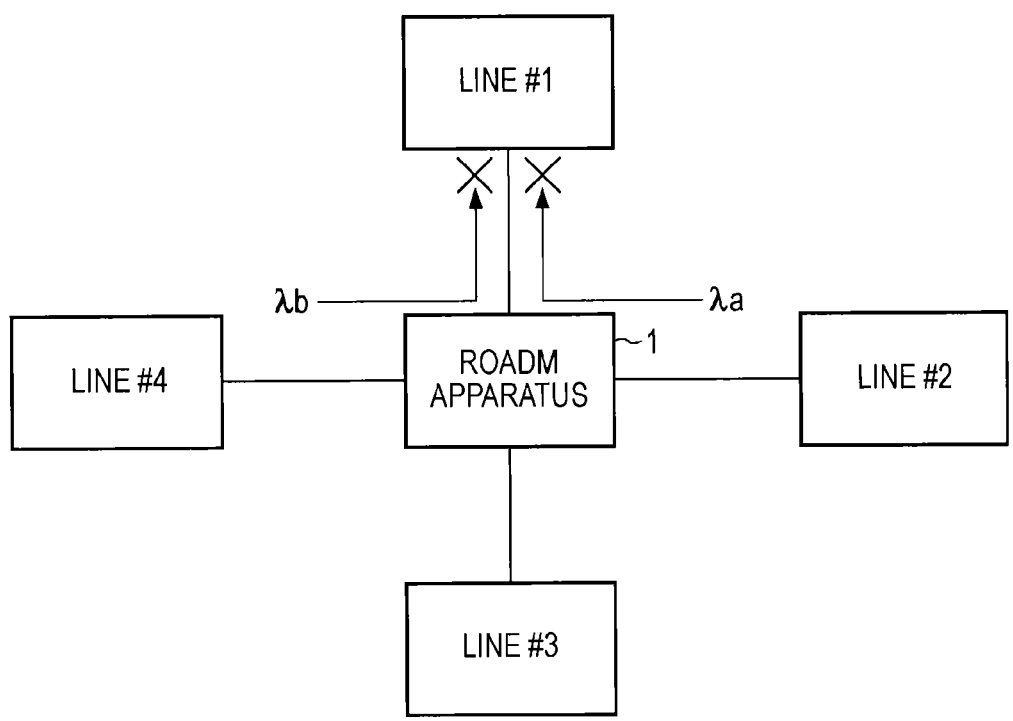
FIG. 9 is a block diagram illustrating a method of detecting the misconnections in the first example.

FIG. 9 is a block diagram illustrating a method of detecting the misconnection in the first example. As illustrated in FIG. 9, with the misconnection in the first example, the optical signal with the wavelength λa (channel-1) is not transmitted from the line #2 to the line #1 and the optical signal with the wavelength λb (channel-3) is not transmitted from the line #4 to the line #1 (as represented by symbols x in FIG. 9); and accordingly the misconnection in the first example is detected. For example, in the networks 20 and 21 illustrated in FIG. 1, when an optical signal with wavelength λa from the ROADM apparatus 1d along line #2 and an optical signal with wavelength λb from the ROADM apparatus 1g along line #4 are not transmitted to the ROADM apparatus 1b along line #1, the misconnection is detected. Instead of using the ROADM apparatuses 1a to 1g, a measurement apparatus or the like may be used to detect a misconnection.

The update processor 100b receives instruction data to use to handle the misconnection from the management apparatus 3 and updates the setting table 102b according to the content of the instruction data. In the present example, the update processor 100b updates the setting table 102b such that one piece of input port information is replaced with another piece of input port information according to the relation of connections between switch units. More specifically, the input port information associated with the input port (e) and the input port information associated with the input port (c) to which optical fibers are wrongly connected (see descriptions in rows denoted by reference numerals 92 and 93 in FIG. 8) are swapped.

Figure 11:
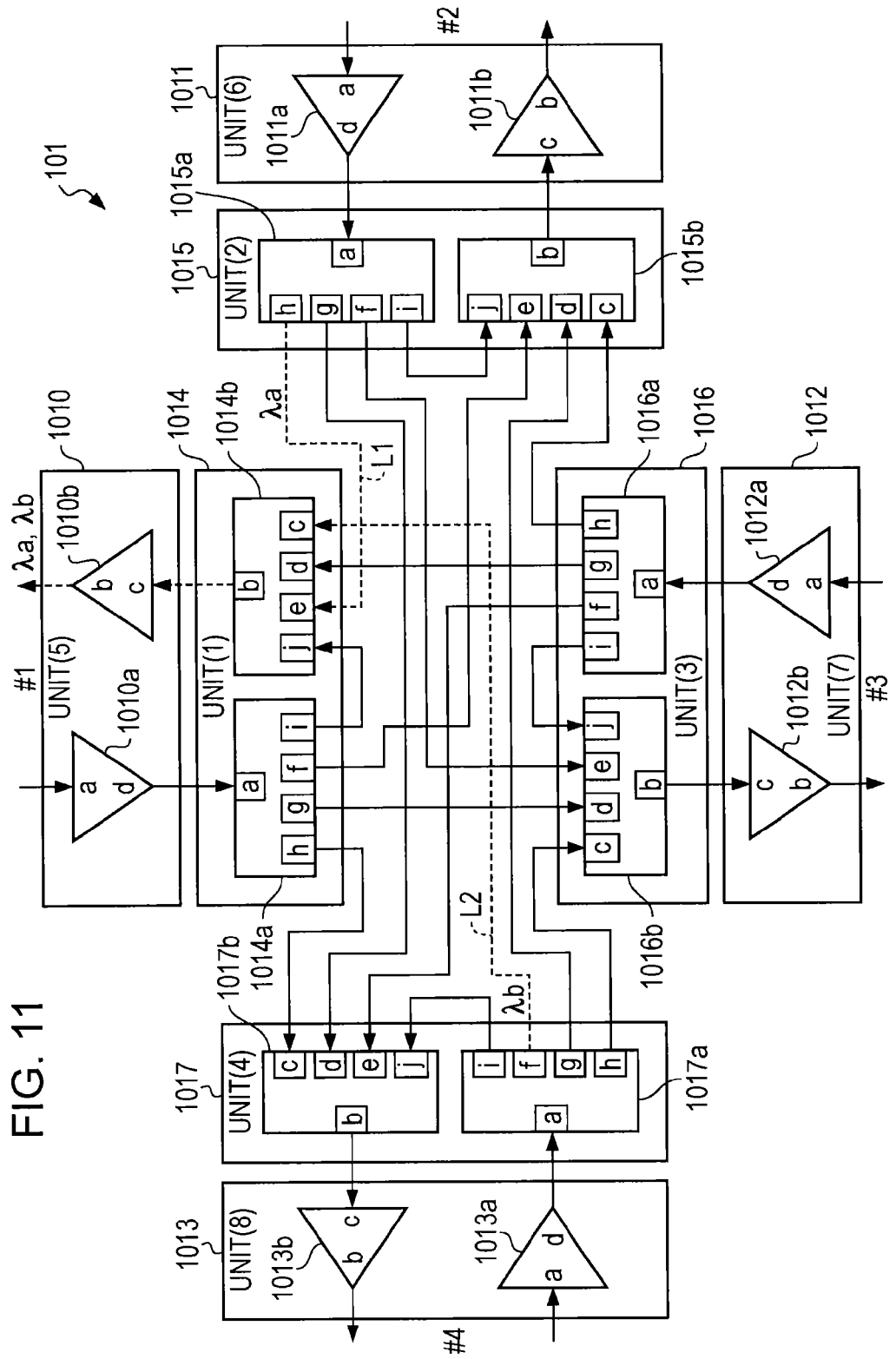
FIG. 11 is a configuration diagram illustrating a cross-connect unit in which optical signal paths are modified so as to correct the misconnections in the first example.

FIG. 10 illustrates the content of the updated setting table 102b. FIG. 11 is a configuration diagram illustrating optical signal paths modified so as to correct the misconnections in the first example in the cross-connect unit. The updated setting table 102b indicates that an optical signal for the channel-1 directed from the line #2 to the line #1 is input to the input port (e) (refer to reference numeral 94), while an optical signal of the channel-3 directed from the line #4 to the line #1 is input to the input port (c) (refer to reference numeral 95). That is, as a result of the update, the optical signal wavelengths selected for the input ports (e) and (c) have been swapped.

The setting processor 100a then resets the cross-connect unit 101 according to the updated setting table 102b. As a result, an optical signal with the wavelength λa is output from the line #2 to the line #1 and an optical signal with the wavelength λb is output from the line #4 to the line #1, as illustrated in FIG. 11. This is achieved because the transmitting-side wavelength selective switch 1014b selects the optical signal with the wavelength λa for the input port (e) and the optical signal with the wavelength λb for the input port (c) according to the updated setting table 102b.

As described above, the update processor 100b updates the content of the setting table 102b such that one piece of input port information and another piece of input port information are swapped according to the definition of connections among the switch units 1014 to 1017. Thus, when some optical fibers connected to the input ports (j), (e), (d), and (c) of the transmitting-side wavelength selective switches 1014b to 1017b are swapped by mistake, a correction may be made without having to physically reconnect misconnected optical fibers. That is, the update processor 100b is capable of updating the setting table 102b such that each wavelength's optical signal is correctly transmitted between specified lines without physically reconnecting wrongly-connected optical fibers.

Second Example of Misconnections

Figure 12:
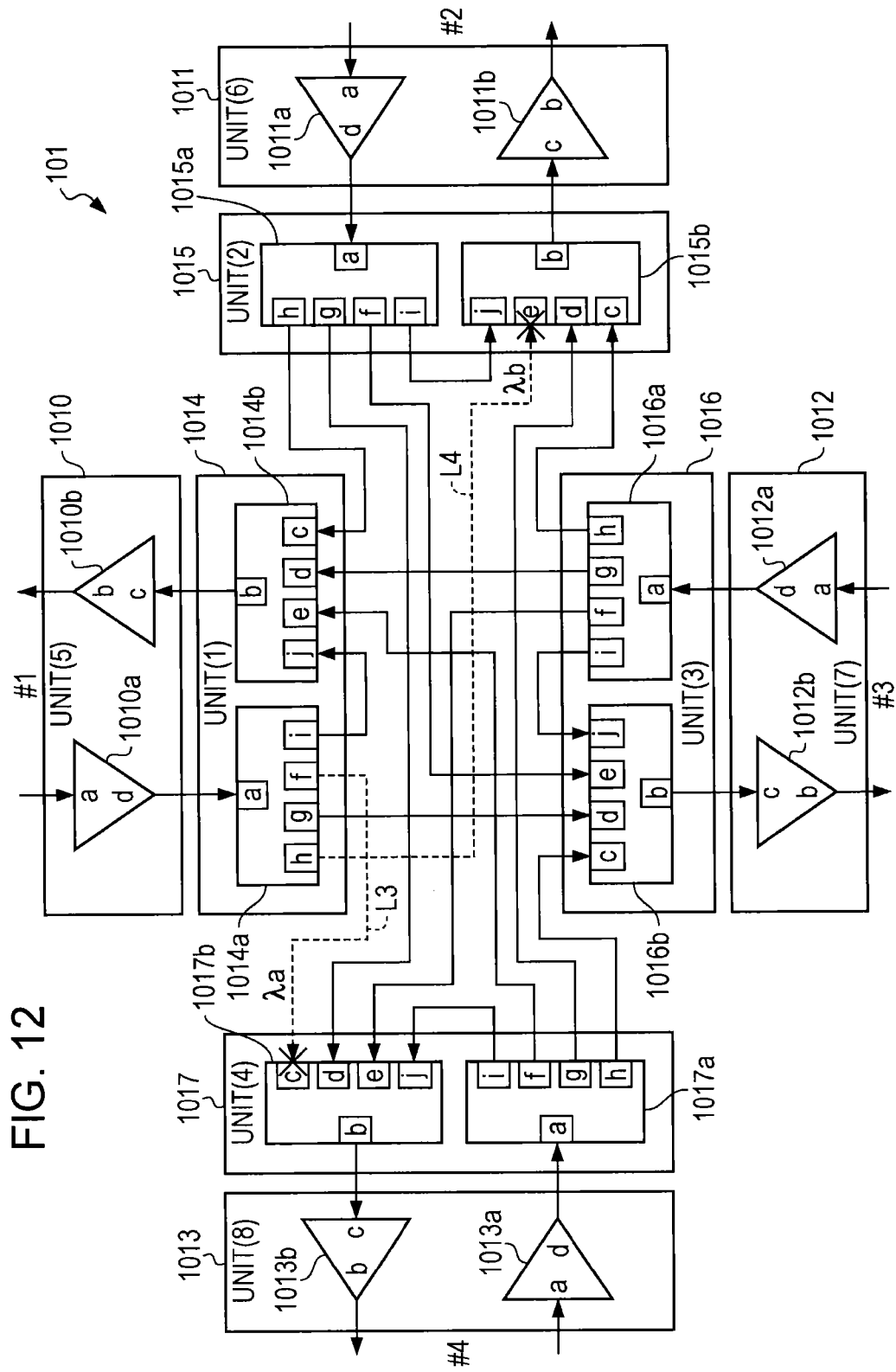
FIG. 12 is a configuration diagram illustrating a second example of misconnections that may occur in the cross-connect unit illustrated in FIG. 3.

FIG. 12 illustrates an example in which connections of some optical fibers to the output ports (h), (g), (f), and (i) of the switch units 1014 to 1017 are in error. In this example, optical fibers L3 and L4 are respectively misconnected to the output ports (h) and (f) of the receiving-side wavelength selective switch 1014a of the line #1 (as represented by dotted lines). According to the path management table 102a illustrated in FIG. 4 and the setting table 102b illustrated in FIG. 5, the optical signal output from output port (h) is channel-3, and the optical signal output from output port (f) is channel-1.

Therefore, when the wavelength of channel-1 is λa and the wavelength of channel-3 is λb, the receiving-side wavelength selective switch 1014a outputs optical signals with wavelengths λa and λb from the respective output ports (h) and (f). The optical signal with the wavelength λa is input to the input port (c) of the transmitting-side wavelength selective switch 1017b, which is along an incorrect line, and the optical signal with the wavelength λb is input to the input port (e) of the transmitting-side wavelength selective switch 1015b, which is also an incorrect line.

Therefore, the optical signals with the wavelengths λa and λb are not output to the correct lines #2 and #4 (as represented by symbols x). Because the wavelength λa has been selected for the input port (e) of the transmitting-side wavelength selective switch 1015b, and the transmitting-side wavelength selective switch 1015b does not output the input optical signal with the wavelength λb to the line #2. Similarly, the transmitting-side wavelength selective switch 1017b does not output the input optical signal with the wavelength λa to the line #4.

Figure 13:
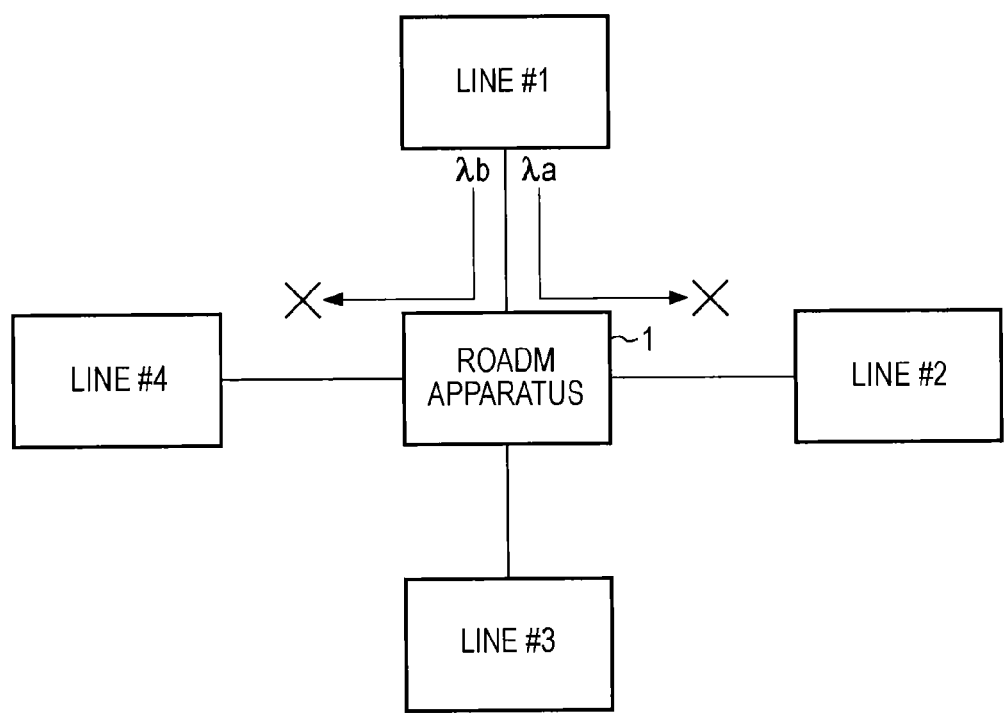
FIG. 13 is a block diagram illustrating a method of detecting the misconnections in the second example.

FIG. 13 is a block diagram illustrating a method of detecting the misconnection in the second example. As illustrated in FIG. 13, with the misconnections in the second example, an optical signal with wavelength λa (channel-1) is not to be transmitted from line #1 to line #2 and an optical signal with wavelength λb (channel-3) is not transmitted from line #1 to the #4, and accordingly the misconnection in the second example may detected. For example, in the networks 20 and 21 illustrated in FIG. 1, the misconnections are detected when an optical signal with wavelengths λa and is not transmitted from the ROADM apparatus 1b along line #1 to the ROADM apparatus 1d along line #2 and an optical signal with wavelength λb is not transmitted from the ROADM apparatus 1b along line #1 to the ROADM apparatus 1g along line #4.

FIG. 14 illustrates the setting table 102b whose content has been updated to correct the misconnections in the present example. The updated setting table 102b specifies connections such that the optical signal for channel-1 directed from line #1 to line #2 is output from the output port (h) (refer to reference numeral 96), while the optical signal for channel-3 directed from line #1 to line #4 is output from the output port (f) (refer to reference numeral 97). That is, as a result of the update, the optical signal wavelengths λb and λa selected for the output ports (h) and (f) have been swapped.

Figure 15:
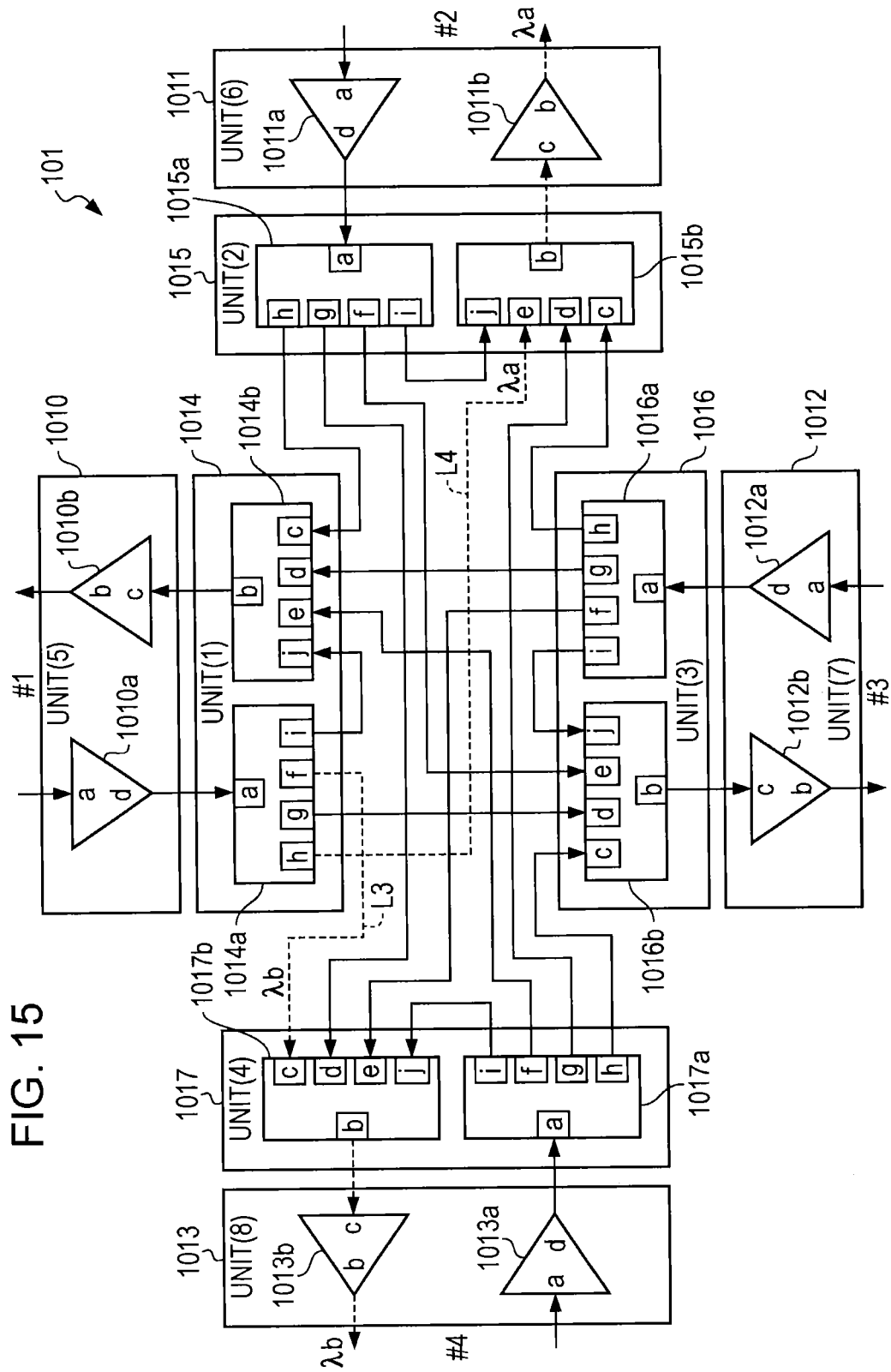
FIG. 15 is a configuration diagram illustrating a cross-connect unit in which optical signal paths modified so as to correct the misconnections in the second example.

The setting processor 100a then sets the cross-connect unit 101 according to the updated setting table 102b. As a result, an optical signal with the wavelength λa is output from line #1 to line #2 and an optical signal with the wavelength λb is output from line #1 to line #4, as illustrated in FIG. 15. This is achieved because the receiving-side wavelength selective switch 1014a follows the updated setting table 102b and selects the optical signal with the wavelength λa for the output port (h) and the optical signal with the wavelength λb for the output port (f).

As described above, the update processor 100b follows the connection relationship among the switch units 1014 to 1017 and updates the content of the setting table 102b by swapping one piece of output port information with another piece of output port information. Thus, when some optical fibers connected to the output ports (h), (g), (f), and (i) of the receiving-side wavelength selective switches 1014a to 1017a are swapped by mistake, correction may be made without having to reconnect misconnected optical fibers.

Third Example of Misconnection

Figure 16:
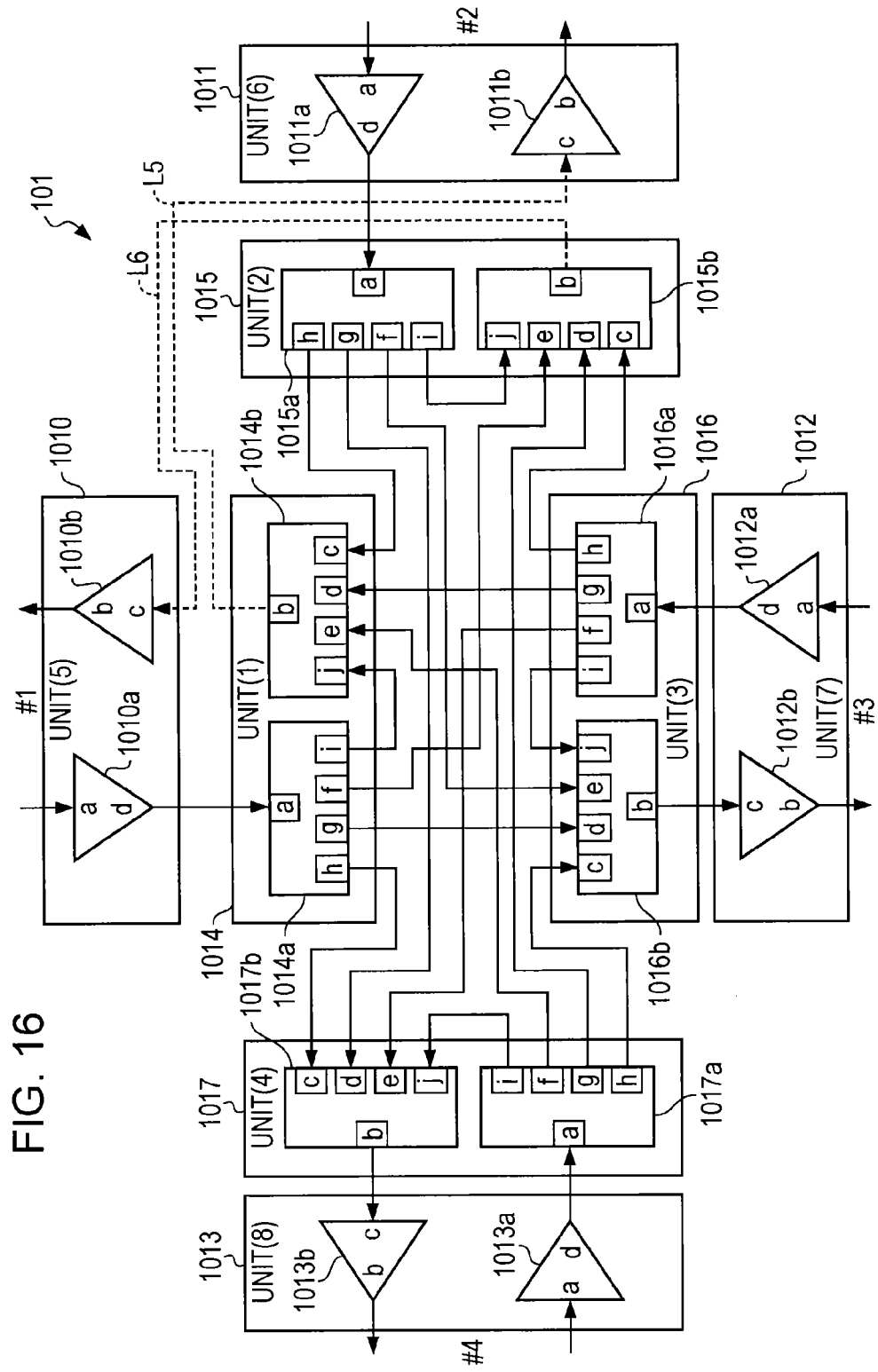
FIG. 16 is a diagram illustrating a third example of misconnections in the cross-connect unit illustrated in FIG. 3.
Figure 17:
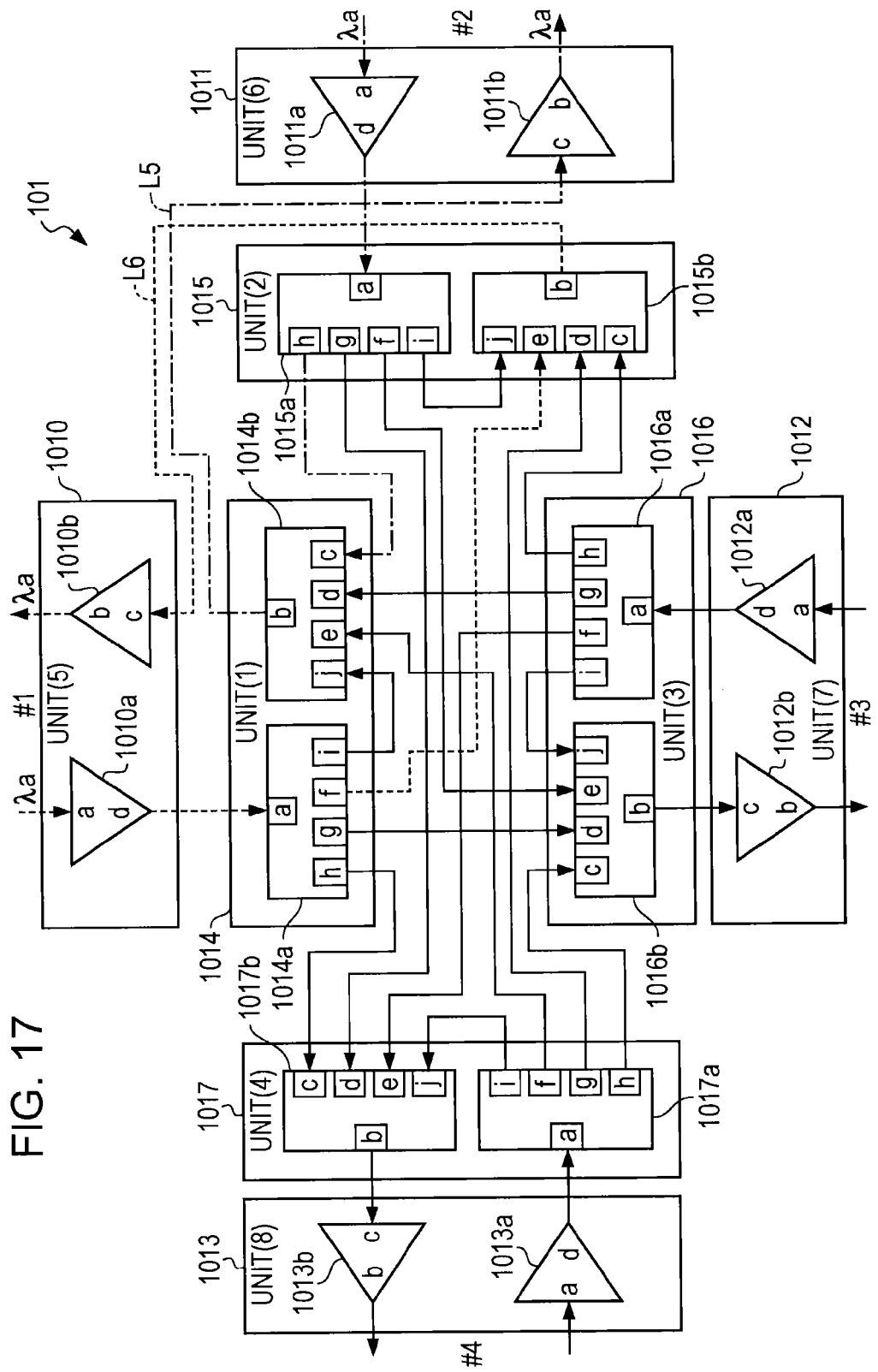
FIG. 17 is a configuration diagram illustrating a cross-connect unit in which there are optical signal paths that includes the misconnections of the third example.

FIG. 16 illustrates a third example of misconnections in which connections of some optical fibers to the transmitting-side amplifiers 1010b to 1013b have been made in error. FIG. 17 is a configuration diagram illustrating optical signal paths in a cross-connect unit that includes the misconnections of the third example. In this example, optical fibers L5 and L6 are swapped by mistake in relation to connections to the input ports (c) of the transmitting-side amplifiers 1010b to 1013b for the lines #1 and #2 (refer to the dotted lines in FIG. 16). More specifically, the connection to the line-side output port (b) of the transmitting-side wavelength selective switch 1014b and the connection to the line-side output port (b) of the transmitting-side wavelength selective switch 1015b have been swapped by mistake.

As a result, as illustrated in FIG. 17, the optical signal of channel-1 that is input from line #1 passes through the transmitting-side wavelength selective switch 1015b, which is for line #2, but returns to the transmitting-side amplifier 1010b and is output to line #1 without being output to the line #2 (as represented by a dotted line). Conversely, although an optical signal for channel-1 input from the line #2 passes through the transmitting-side wavelength selective switch 1014b, which is for line #1, the optical signal for channel-1 is returned to the transmitting-side amplifier 1011b, which is for line #2 and output to the line #2 without being output to the line #1 (as represented by a dashed-dotted line). Thus, optical signals for the channel-1 are not correctly transmitted between the lines #1 and #2.

Figure 18:
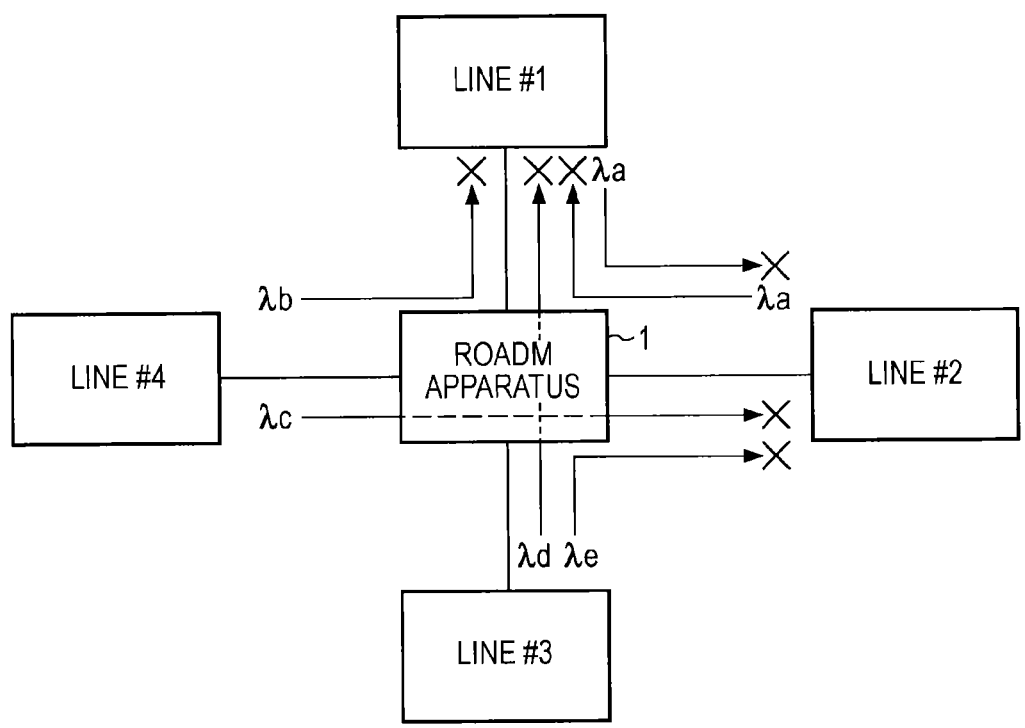
FIG. 18 is a block diagram illustrating a method of detecting the misconnections of the third example.

FIG. 18 is a block diagram illustrating a method of detecting misconnections of the third example. As illustrated in FIG. 18, the misconnections of the present example may be detected because optical signals with specified wavelengths not to be correctly transmitted among the lines #1 to #4 (as represented by symbols x). The wavelengths of the channel-1 to channel-5, which are listed in the path management table 102a illustrated in FIG. 4, are respectively denoted as λa, λd, λb, λc, and λe in FIG. 18.

With the misconnections in the present example, an optical signal with the wavelength λa is not transmitted from line #1 through to line #2, an optical signal with the wavelength λb is not transmitted from line #4 through to line #1, an optical signal with the wavelength λc is not transmitted from line #4 through to line #2, an optical signal with the wavelength λd is not transmitted from line #3 through to line #1, and an optical signal with the wavelength λe is not transmitted from the line #3 and the line #2.

FIG. 19 illustrates items, in the setting table 102b illustrated in FIG. 5, that are to be updated to correct the misconnections in the present example. With the misconnections in the present example, the optical fiber L5 connected to the input port (c) of the transmitting-side amplifier 1010b (unit (5)) and the optical fiber L6 connected to the input port (c) of the transmitting-side amplifier 1011b (unit (6)) have been swapped by mistake. To handle the misconnections, the update processor 100b swaps the input port information (denoted by reference numerals 82 and 83) corresponding to the misconnected input ports.

In addition, lines (refer to the broken circles in FIG. 19) for the line-side output port (b) and the input ports (j), (e), (d), (c) of the transmitting-side wavelength selective switches 1014b (unit (1)) and 1015b (unit (2)) are swapped according to the description given above. More specifically, the line for the transmitting-side wavelength selective switch 1014b is changed from #1 to #2, and the line for the transmitting-side wavelength selective switch 1015b is changed from #2 to #1. As a result, the transmitting-side wavelength selective switches 1014b and 1015b correspond to correct lines according to the connections for the optical fibers L5 and L6.

Figure 21:
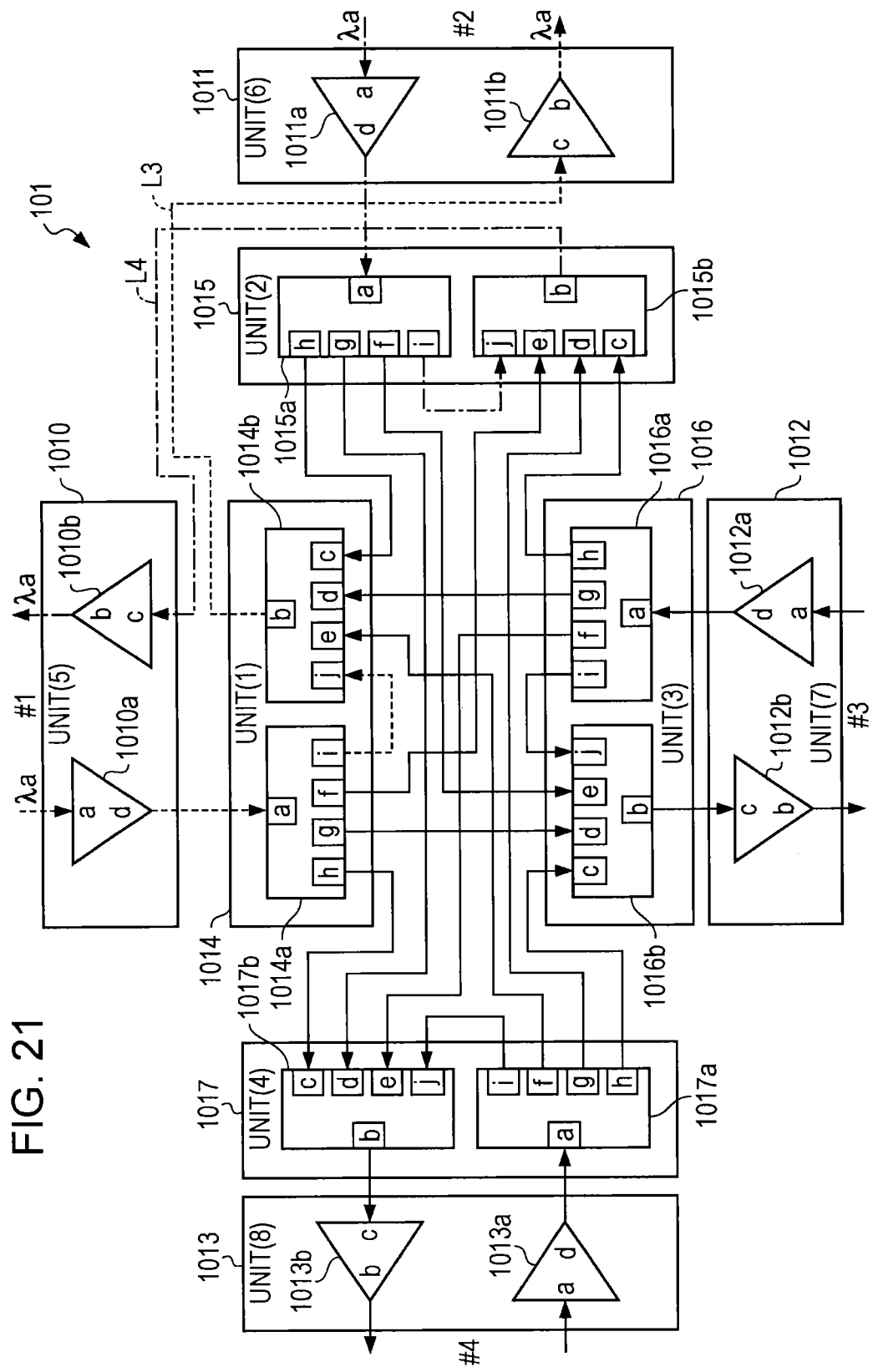
FIG. 21 is a configuration diagram illustrating a cross-connect unit in which optical signal paths are modified so as to correct the misconnections in the third example.

FIG. 20 illustrates the setting table 102b whose content has been updated to correct the misconnections in the present example. FIG. 21 is a configuration diagram for the cross-connect unit illustrating optical signal paths modified so as to correct the misconnections in the third example. In the updated setting table 102b in FIG. 20, as denoted by reference numerals 84 and 85, the input port information for the transmitting-side amplifiers 1010b and 1011b has been swapped. The lines for the transmitting-side amplifiers 1010b and 1011b are determined, as described above, according to the slot positions, and thus are not changed.

The lines of the transmitting-side wavelength selective switches 1014b and 1015b have been swapped between the lines #1 and #2 (as enclosed in circles), that is, input port information between them has been swapped. As a result, channel-1 is set, via the output port (i) and the input port (j), between the transmitting-side wavelength selective switch 1014b and the receiving-side wavelength selective switch 1014a in the unit (1) and also between the transmitting-side wavelength selective switch 1015b and the receiving-side wavelength selective switch 1015a in the unit (2) (as indicated by reference numerals 95 and 96 in FIG. 20).

The setting processor 100a then sets the cross-connect unit 101 according to the updated setting table 102b. As a result, as illustrated in FIG. 21, an optical signal with the wavelength λa is output from the line #1 to the line #2 (as represented by a dotted line) and from the line #2 to the line #1 (as represented by a dashed-dotted line). This is achieved because the configuration is changed according to the updated setting table 102b such that the transmitting-side wavelength selective switches 1014b and 1015b respectively correspond to the lines #2 and #1, and due to the change of lines the input port (j) is selected for an optical signal with the wavelength λa.

As described above, the transmitting-side wavelength selective switches 1014b to 1017b wavelength-multiplex optical signals with the respective wavelengths input from the input ports (j), (e), (d), and (c) and output resultant wavelength-multiplexed signals to the lines #1 to #4. Conversely, the receiving-side wavelength selective switches 1014a to 1017a output wavelength-multiplexed signals, which are input from the lines #1 to #4, from the output ports (h), (g), (f), and (i). In each of the units (1) to (4) (switch units 1014 to 1017), the input port (j) of the corresponding one transmitting-side wavelength selective switch of the transmitting-side wavelength selective switches 1014b to 1017b is connected to the output port (i) of the corresponding one receiving-side wavelength selective switch of the receiving-side wavelength selective switches 1014a to 1017a.

Thus, according to the present embodiment, even when in each of the units (1) to (4), the transmitting-side wavelength selective switches 1014b to 1017b and the receiving-side wavelength selective switches 1014a to 1017a are set to correspond to incorrect lines, the paths of optical signals may be correctly established via the input port (j) and the output port (i). Therefore, even when connections are wrongly made such that some of the transmitting-side amplifiers 1010b to 1013b are swapped as in the present example, it becomes possible to transmit optical signals between correct lines #1 and #4 by updating the setting table 102b. Even when some of the receiving-side amplifiers 1010a to 1013a are swapped as a result of misconnections, it is possible to handle the misconnections by updating the setting table 102b in a similar manner.

Although paths of optical signals are illustrated only for the channel-1 in FIG. 21, optical signals are also transmitted between correct pairs of lines #1 to #4 via other channels according to the updated setting table 102b. This is achieved because the setting table 102b is updated such that the transmitting-side wavelength selective switches 1014b and 1015b correctly correspond to the respective lines #2 and #1, and optical signals with correct wavelengths corresponding to the respective channels are selected for the corresponding input ports (e), (d), and (c).

As described above, the update processor 100b updates the content of the setting table 102b according to the connection relationships of the switch units 1014 to 1017 such that, for the transmitting-side amplifiers 1010b to 1013b, one piece of input port information and another piece of input port information are swapped. In addition, the update processor 100b further updates the content of the setting table 102b such that, for the transmitting-side wavelength selective switches 1014b to 1017b, one piece of input port information and another piece of input port information are swapped. Thus, even when optical fibers are swapped by mistake in relation to connections to the input ports (c) of the transmitting-side amplifiers 1010b to 1013b, corrections may be made without having to reconnect the optical fibers.

Figure 22:
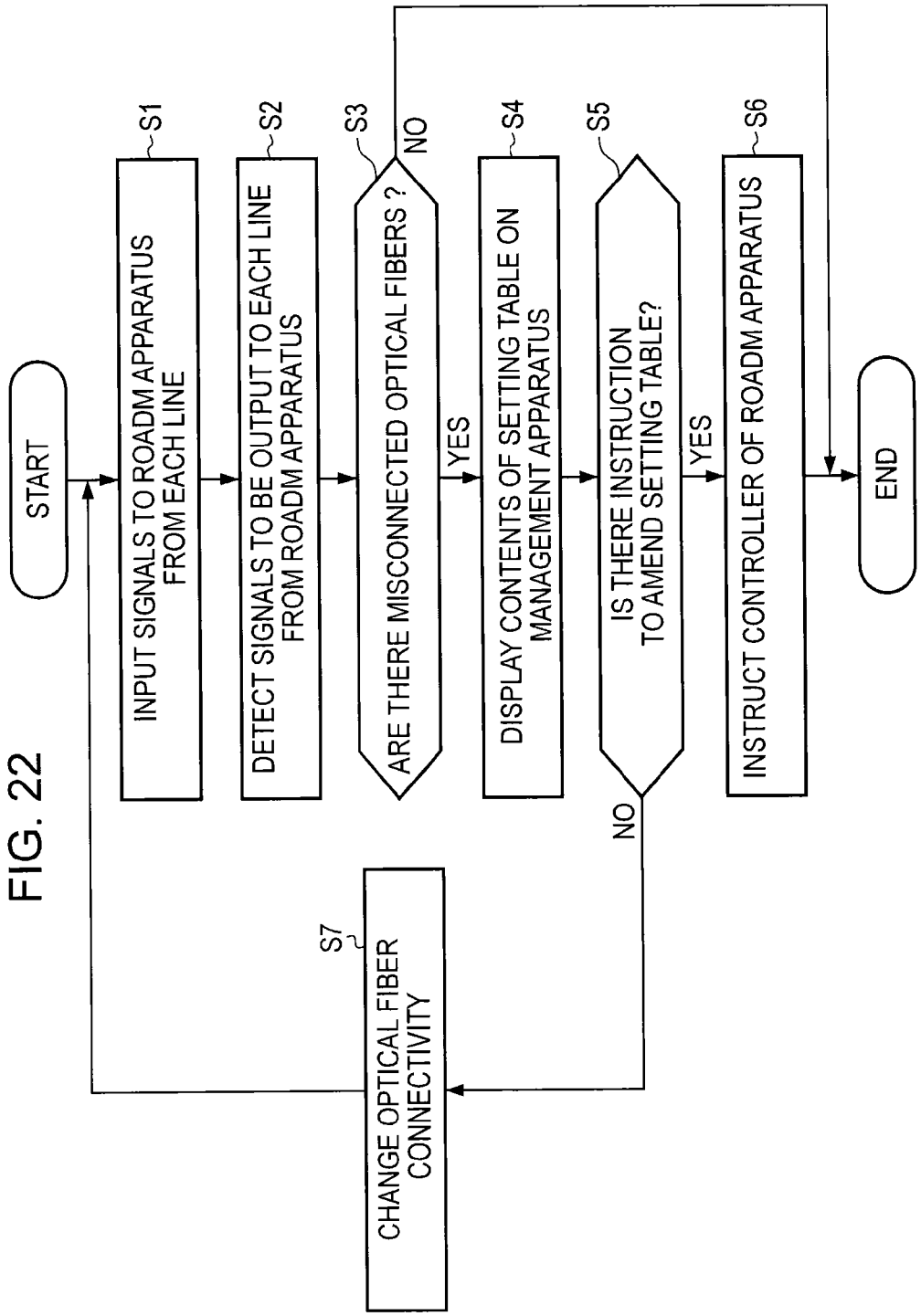
FIG. 22 is a flowchart illustrating a process performed by a management apparatus.
Figure 23:
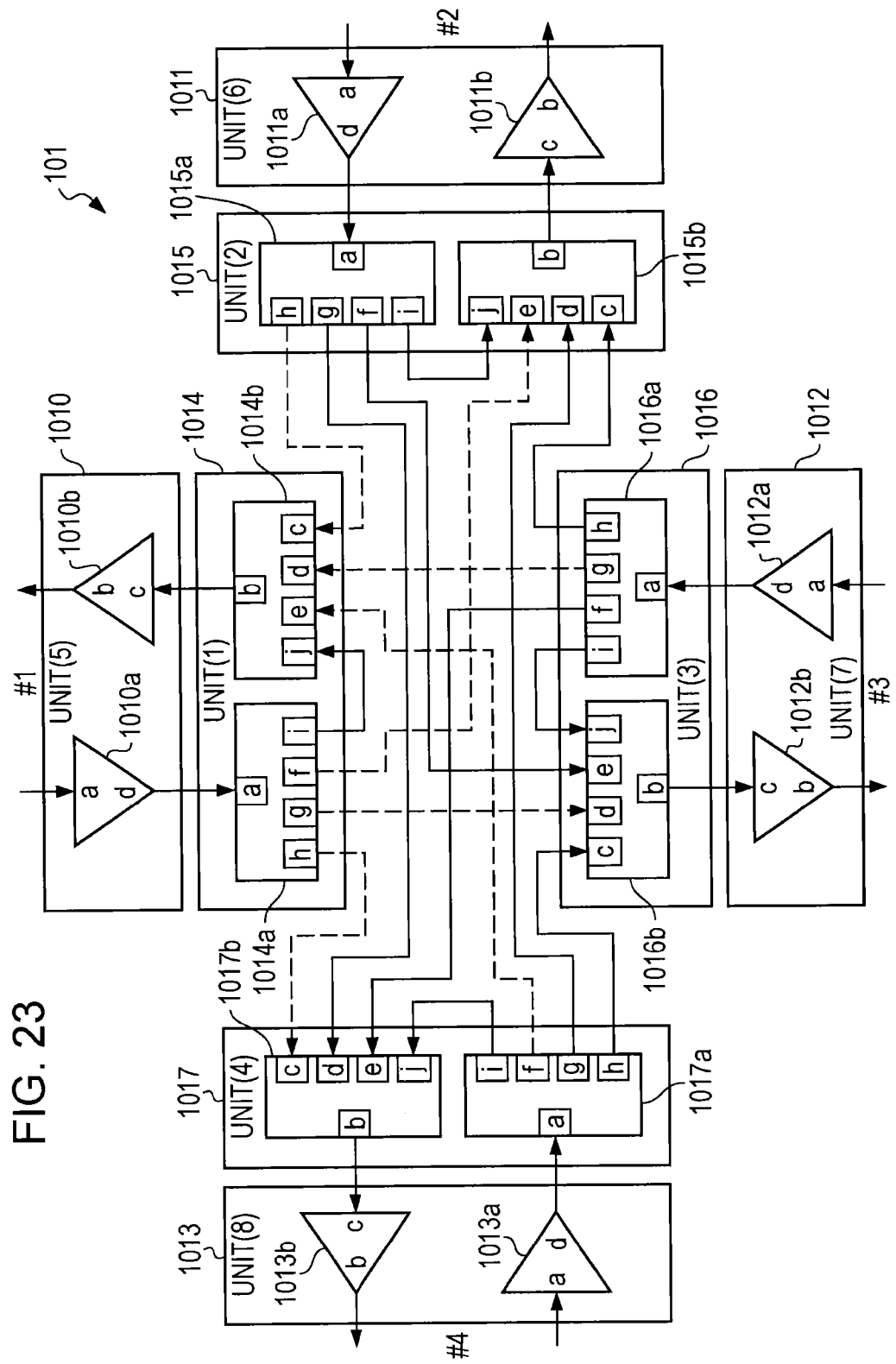
FIG. 23 is a configuration diagram illustrating connections of optical fibers when a unit corresponding to a line #1 is additionally installed in the cross-connect unit illustrated in FIG. 3.
Figure 24:
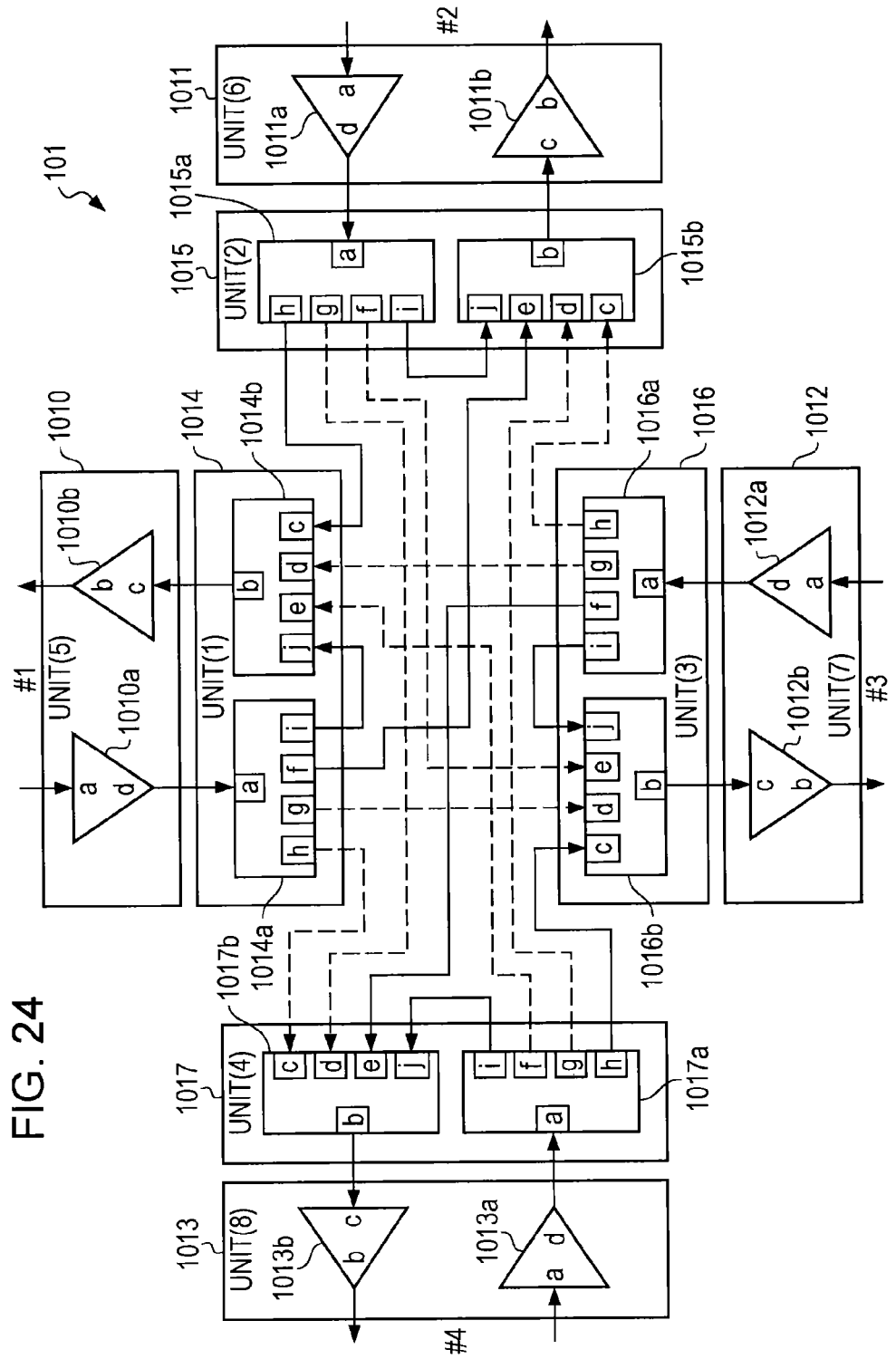
FIG. 24 is a configuration diagram illustrating connections of optical fibers when the number of lines is increased from two to four in a cross-connect unit.
Figure 25:
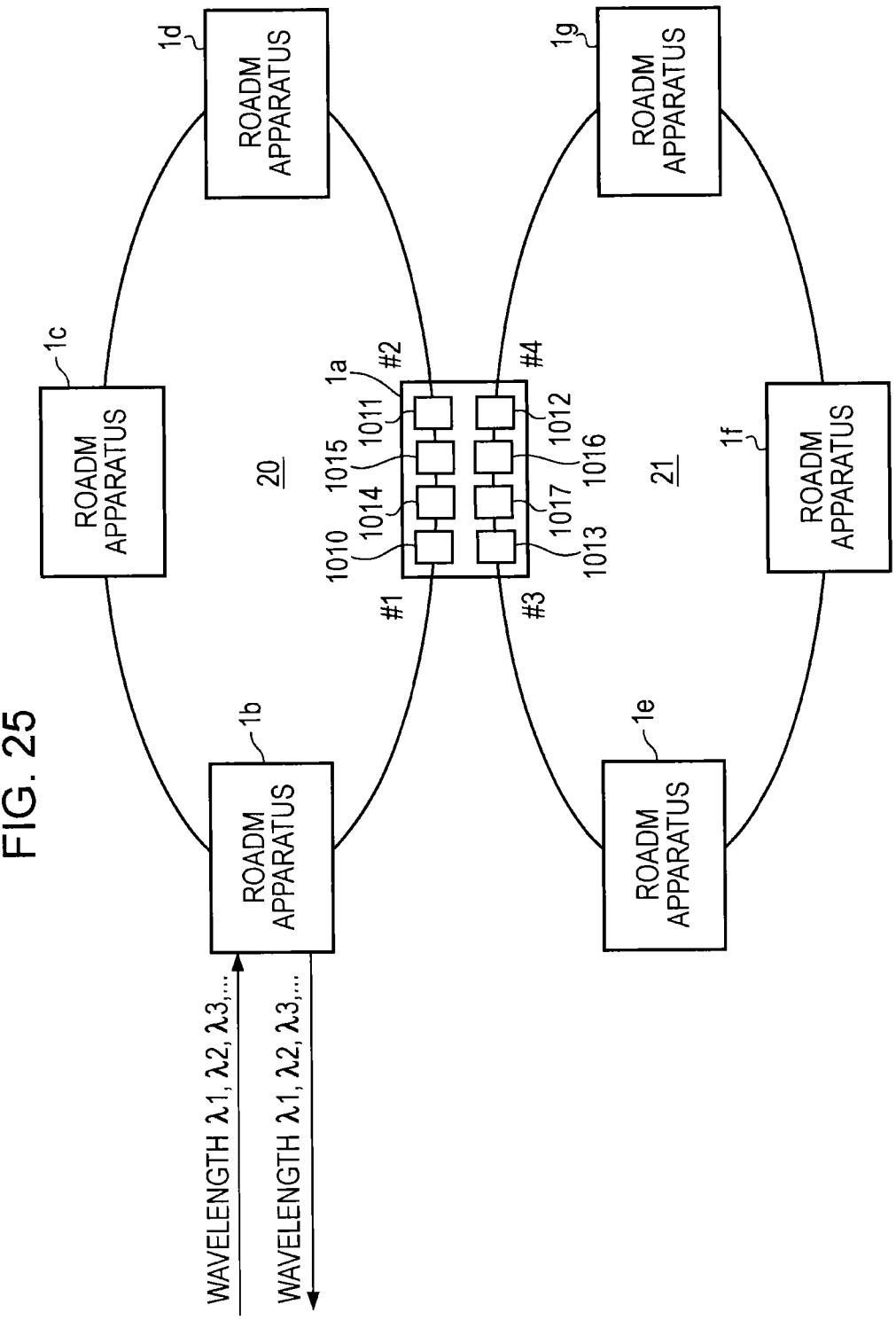
FIG. 25 is a configuration diagram illustrating an example of a network that includes a ROADM apparatus adapted to two lines.

FIG. 22 is a flowchart illustrating a process performed by a management apparatus. The flow of the process performed by the management apparatus 3 is described with reference to FIG. 22. FIG. 23 is a diagram illustrating connections of optical fibers in the cross-connect unit illustrated in FIG. 3 when a unit corresponding to the line #1 is installed. FIG. 24 is a configuration diagram illustrating connections of optical fibers in a cross-connect unit when the number of lines is increased from two to four. FIG. 25 is a diagram illustrating an example of a configuration of a network that includes a ROADM apparatus adapted to two lines.

Referring to FIG. 22, the management apparatus 3 controls ROADM apparatuses 1b, 1d, 1e, and 1g such that optical signals with respective wavelengths are input to a ROADM apparatus 1a from each of the lines #1 to #4 in the networks 20 and 21 illustrates in FIG. 1 (operation S1). The management apparatus 3 also controls the ROADM apparatuses 1b, 1d, 1e, and 1g such that optical signals with respective wavelengths that are output from the ROADM apparatus 1a to each of the lines #1 to #4 are detected (operation S2).

As a result, the management apparatus 3 checks whether there is a misconnected optical fiber as described above with reference to FIG. 9, FIG. 13, and FIG. 18. The management apparatus 3 may include a database in which data is stored to indicate whether optical signals are allowed to be transmitted among lines #1 to #4 for each channel and indicate correspondence with ports concerned with misconnections of optical fibers, and the management apparatus 3 may determine, based on the database, input ports or output ports concerned with misconnections.

Misconnections of optical fibers may occur in various situations. For example, when the ROADM apparatus 1 is installed, in order to connect all the ports up with optical fibers, misconnections of first to third examples described above may occur. When a unit (1) (switch unit 1014) and a unit (5) (amplifier unit 1014) are added to the apparatus, for example, to connect an additional line as illustrated in FIG. 23, the misconnections described above with reference to the first and second example may occur because optical fibers are connected to existing switch units 1015 to 1017 (as represented by dotted lines). Misconnections may also occur when a unit of some line is replaced to repair a failure or for other reasons.

Similar misconnections may also occur when units (1), (2), (5), and (6), which connect two lines #1 and #2, are connected (via paths represented by dashed lines) to units (3), (4), (7), and (8), which connect the other two lines #3 and #4 as illustrated in FIG. 24. More specifically, when the networks 20 and 21 illustrated in FIG. 1 are not connected to each other and the networks 20 and 21 separately pass through the ROADM apparatus 1a without having any connection as illustrated in FIG. 25, the ROADM apparatus 1a may be modified to deal with four lines to establish connection between the networks 20 and 21.

Referring back to FIG. 22, the management apparatus 3 detects a misconnected optical fiber (that is, if the answer to operation S3 is YES), the management apparatus 3 displays the content of the setting table 102b on a display unit or the like of the management apparatus 3 (operation S4). There is no particular restriction on the manner of displaying the setting table 102b. When a misconnection is not detected for any optical fiber (that is, when the answer to operation S3 is NO), the management apparatus 3 ends the process.

Next, in response to the detection of the misconnection, if a user inputs correction data to correct the content of the setting table 102b (that is, if the answer to operation S5 is YES), then the management apparatus 3 instructs the controller 100 of the ROADM apparatus 1 to update the setting table 102b according to the correction data (operation S6). The correction data may be input, for example, by specifying a set of input port information or output port information to be replaced using an operation unit such as a command line interface (CLI). When no correction data is input by a user (that is, when the answer to operation S5 is NO), a maintenance person for the apparatus 1 reconnects optical fibers to correct the misconnections (operation S7), and the process returns to operation S1.

In response to an operation performed by a user, the management apparatus 3 may read the updated content of the setting table 102b from the storage unit 102 via the controller 100 of the ROADM apparatus 1 and may display the updated content of the setting table 102b. The displayed information may be limited to a difference from default content, and may include the output port information, the updated input port information, and the default output port information and input port information (information before the update).

For example, with the first example of misconnection described above, the displayed information may include "unit 2-h→unit 1-e (unit 1-c)", and "unit 4-f→unit 1-c (unit 1-e)". With the third example of misconnection described above, the displayed information may include "unit 1-b→unit 6-c (unit 5-c)", and "unit 2-b→unit 5-c (unit 6-c)". In this example, each piece of information enclosed in parentheses represents default input port information.

Figure 26:
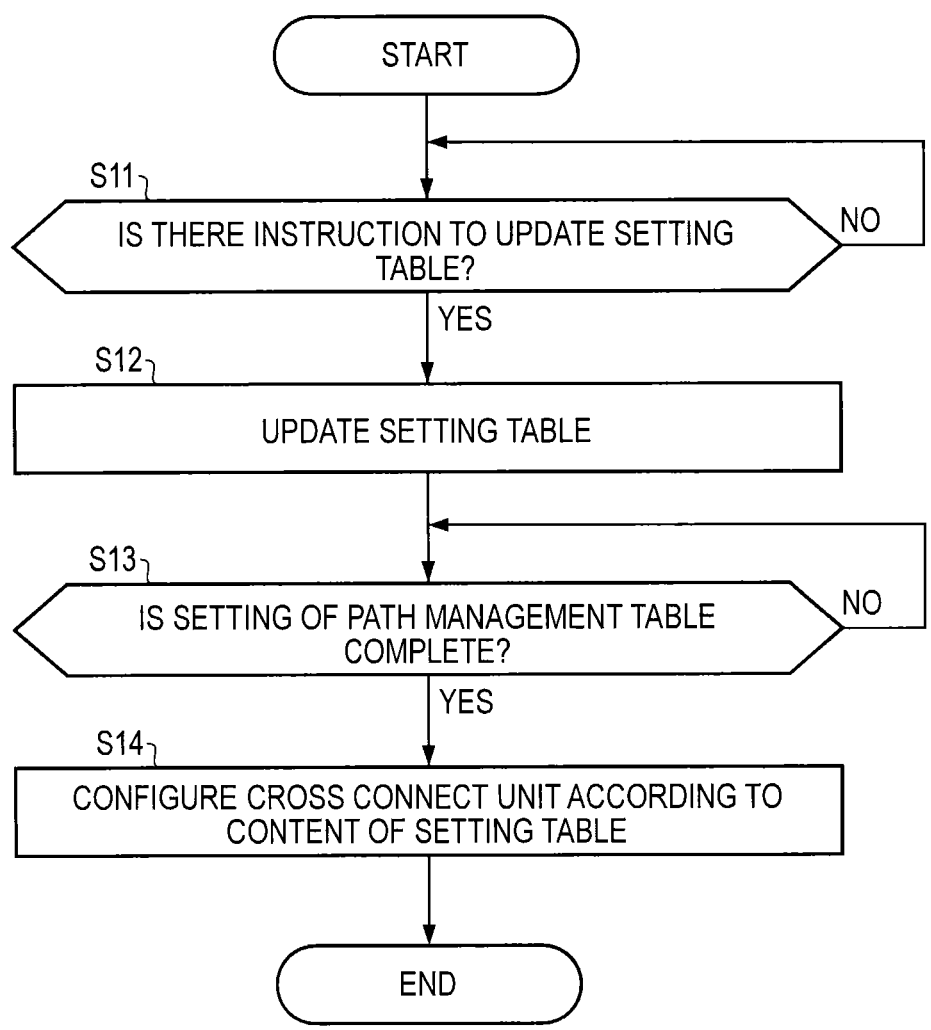
FIG. 26 is a flowchart illustrating a process performed by a controller of a ROADM apparatus.

FIG. 26 is a flowchart illustrating a process performed by a controller of a ROADM apparatus. The flow of the process performed by the controller 100 is described with reference to FIG. 26. When the controller 100 receives a command to update the setting table 102b from the management apparatus 3 (that is, when the answer to operation S11 is YES), the controller 100 controls the update processor 100b to update the setting table 102b according to the command (operation S12).

Next, the controller 100 determines whether setting of the path management table 102a is complete (operation S13). When the setting is not complete yet (that is, when the answer to operation S13 is NO), the controller 100 waits until the setting is complete. Conversely, when the setting is complete (that is, when the answer to operation S13 is YES), the controller 100 controls the setting processor 100a to reconfigure the cross-connect unit 101 according to the updated content of the setting table 102b (operation S14). The path management table 102a is set by the management apparatus 3 according to an operation performed by a user. In this way, the process of correcting misconnections is performed.

As described above, in the optical cross-connect apparatus 10, in response to an input from the management apparatus 3, the update processor 100b updates the setting table 102b defining connections of input ports and output ports for the optical signal for each wavelength among lines #1 to #4. Thus, the optical cross-connect apparatus 10 is capable of setting the wavelengths for the respective wavelength selective switches 1014a to 1017a and 1014b to 1017b according to the connection relationships of optical fibers such that an optical signal for each wavelength is correctly transmitted between specific lines. Therefore, the optical cross-connect apparatus 10 is capable of easily correct misconnections of optical fibers without having to go to the effort of physically reconnecting optical fibers.

Figure 27:
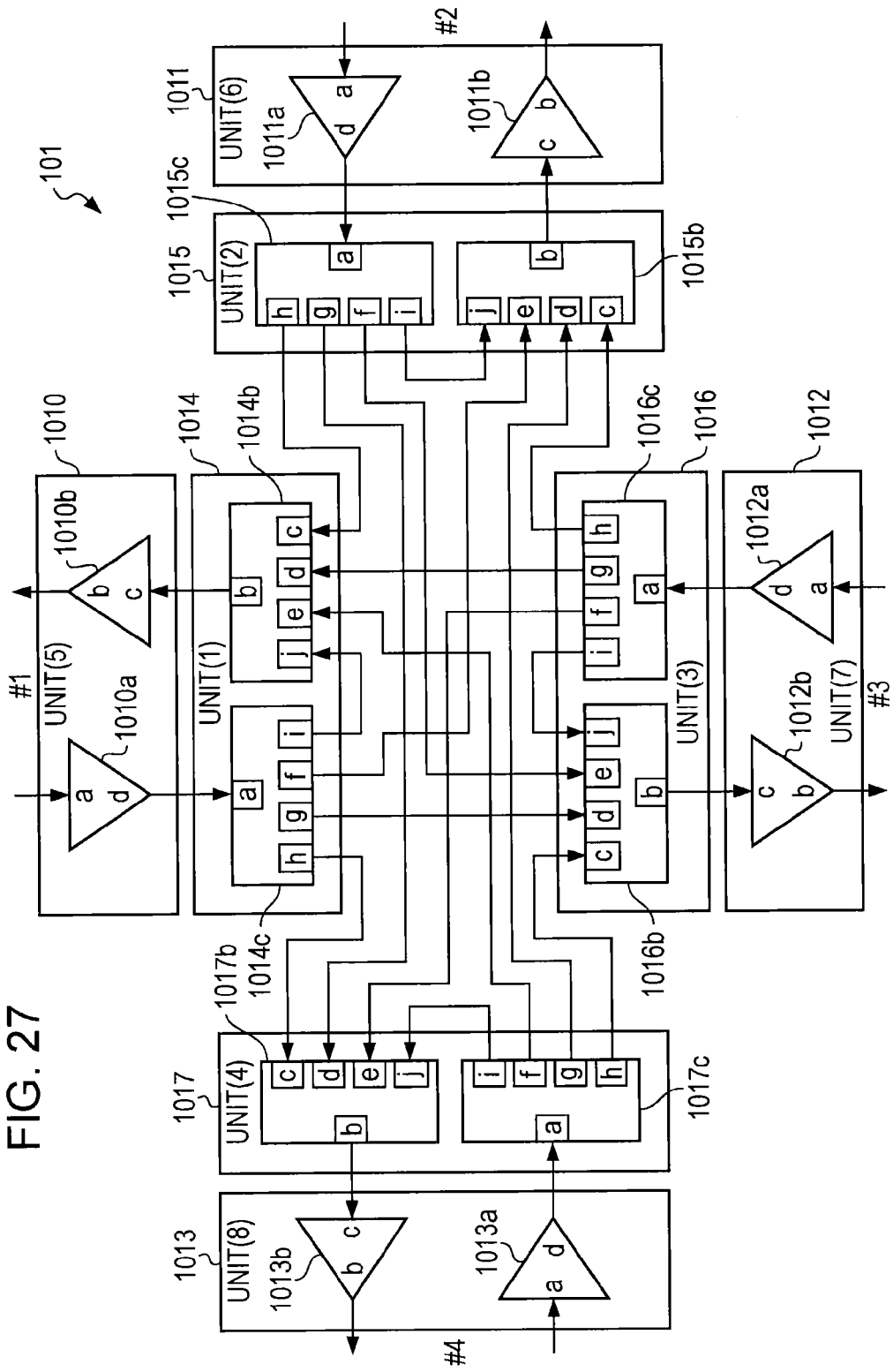
FIG. 27 is a configuration diagram illustrating a cross-connect unit according to another embodiment.
Figure 28:
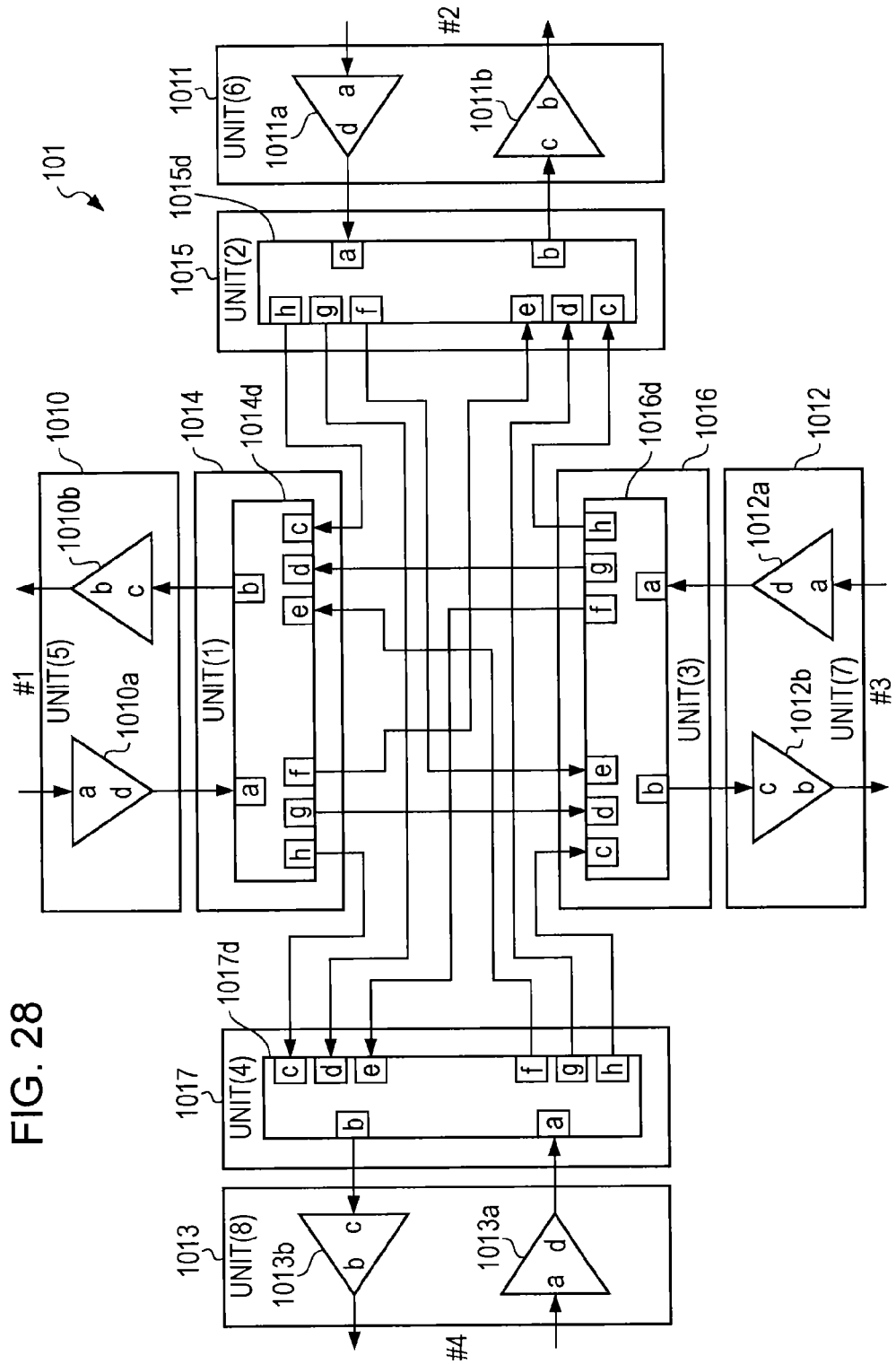
FIG. 28 is a configuration diagram illustrating a cross-connect unit according to still another embodiment.

In the embodiment described above, wavelength selective switches may be used as optical elements of switch units 1014 to 1017 on transmitting and receiving sides. However, the optical elements are not limited to wavelength selective switches. FIG. 27 is a diagram illustrating a configuration of a cross-connect unit according to another embodiment. FIG. 28 is a diagram illustrating a configuration of a cross-connect unit according to still another embodiment. For example, the receiving-side wavelength selective switches 1014a to 1017a illustrated in FIG. 4 may be replaced with optical splitters (SPL) 1014c to 1017c as illustrated in FIG. 27. In this case, the optical splitters 1014c to 1017c do not select wavelengths of optical signals output from the output ports (h), (g), (f), and (i), but the optical splitters 1014c to 1017c simply split the wavelength-multiplexed signal input from the input port (a) and output resultant split signals. However, the transmitting-side wavelength selective switches 1014b to 1017b select wavelengths of optical signals output from the output port (b), and thus it is possible to correct misconnections in a similar manner to the previous embodiment.

In the embodiments described above, each of the switch units 1014 to 1017 includes a pair of 1×N(N>4) wavelength selective switches. Alternatively, as illustrated in FIG. 28, N×M(N>2, M>6) wavelength selective switches 1014d to 1017d may be used. In this case, each of the wavelength selective switches 1014d to 1017d multiplexes part of optical signals with respective wavelengths obtained by demultiplexing a wavelength-multiplexed signal input from the input port (a), and outputs the resultant multiplexed signal from the output port (b). Therefore, it is possible to handle misconnections of the type in the third example described above without having to connect the input port (j) and the output port (i) within each of the switch units 1014 to 1017 as in the embodiments described above.

Although the present disclosure has been described above in detail with reference to specific embodiments, various changes will be apparent to persons skilled in the art without departing from the spirit and scope of the disclosure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical cross-connect apparatus comprising:
   a plurality of switch units connected to each other via a plurality of input ports and a plurality of output ports such that wavelength-multiplexed signals are input and output between two or more lines, and each optical signal with a respective wavelength included in a wavelength-multiplexed signal is transmitted from a first line of the lines to a second line of the lines or from the second line to the first line;

a storage unit configured to store a setting table in which output port information and corresponding input port information are associated together and registered for each optical signal such that the output port information identifies a specific output port, in the plurality of output ports, that outputs the optical signal and the input port information identifies a specific input port, in the plurality of input ports, that inputs the optical signal;

a setting processor configured to set each switch unit in the plurality of switch units according to the setting table so as to set a wavelength for each optical signal that is input via the input ports or output via the output ports; and an update processor configured to update the content of the setting table in response to information of external input.

2. The optical cross-connect apparatus according to claim 1, wherein each switch unit in the plurality of switch units includes;

a first optical element configured to wavelength-multiplex each optical signal with a respective wavelength input from the input ports and output a resultant wavelength-multiplexed signal to one of the lines; and a second optical element configured to wavelength-demultiplex a wavelength-multiplexed signal input from the one of the lines and output resultant optical signals, from the output ports, wherein the first optical element and the second optical element are connected to each other via one input port in the plurality of input ports and one output port in the plurality of output ports.

3. The optical cross-connect apparatus according to claim 1, wherein the update processor updates the content of the setting table such that one piece of input port information and another piece of input port information are swapped or one piece of output port information and another piece of output port information are swapped according to a relationship in terms of connections in switch units.

* * * * *